Figure 15:
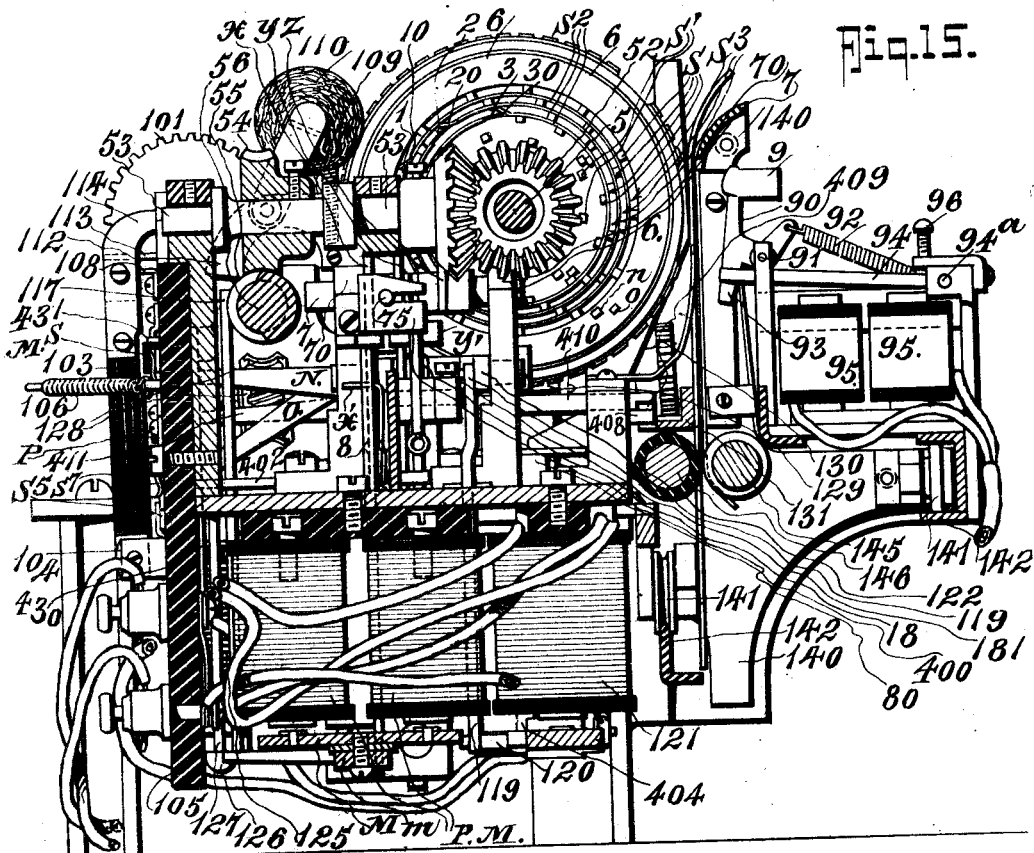

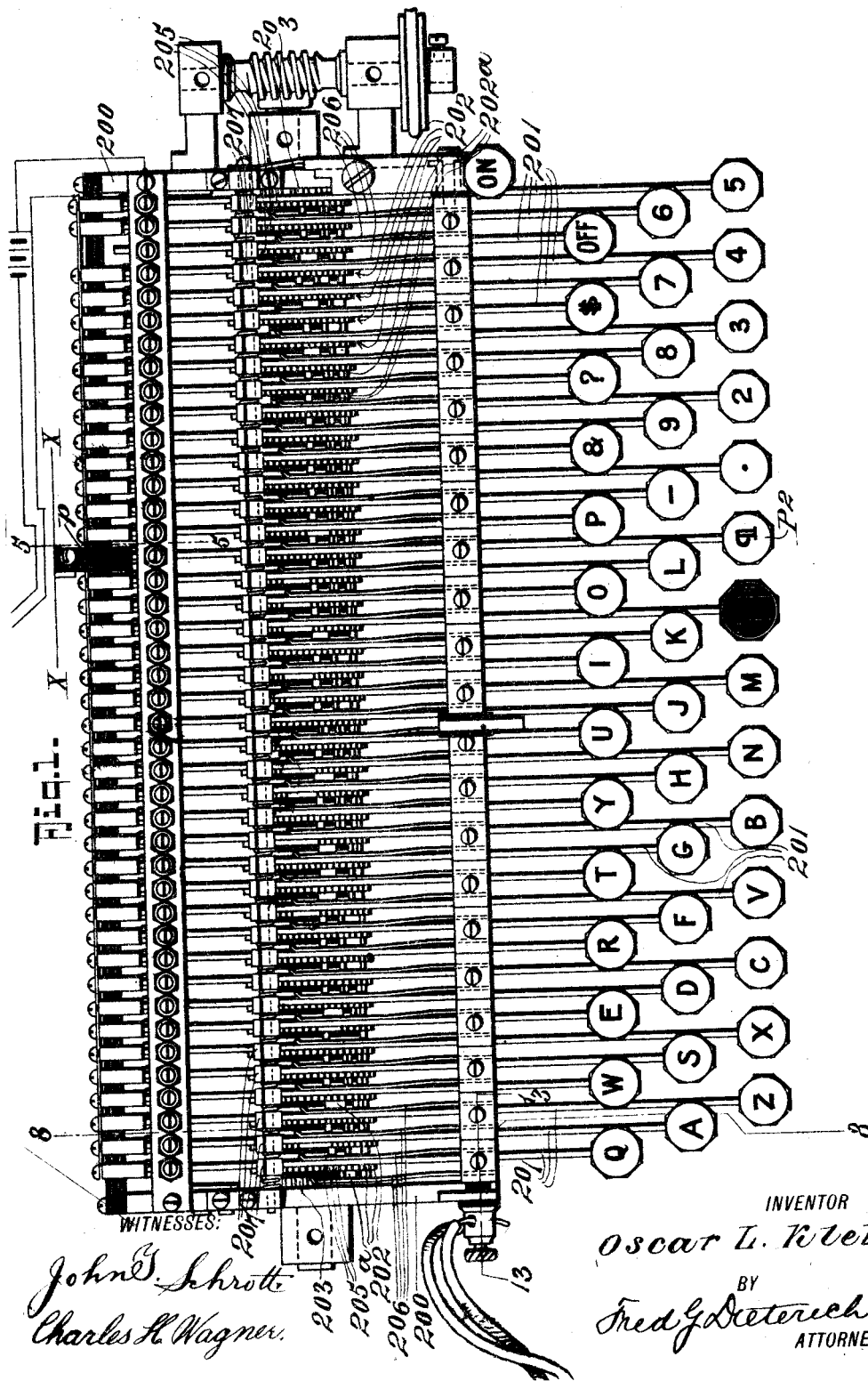

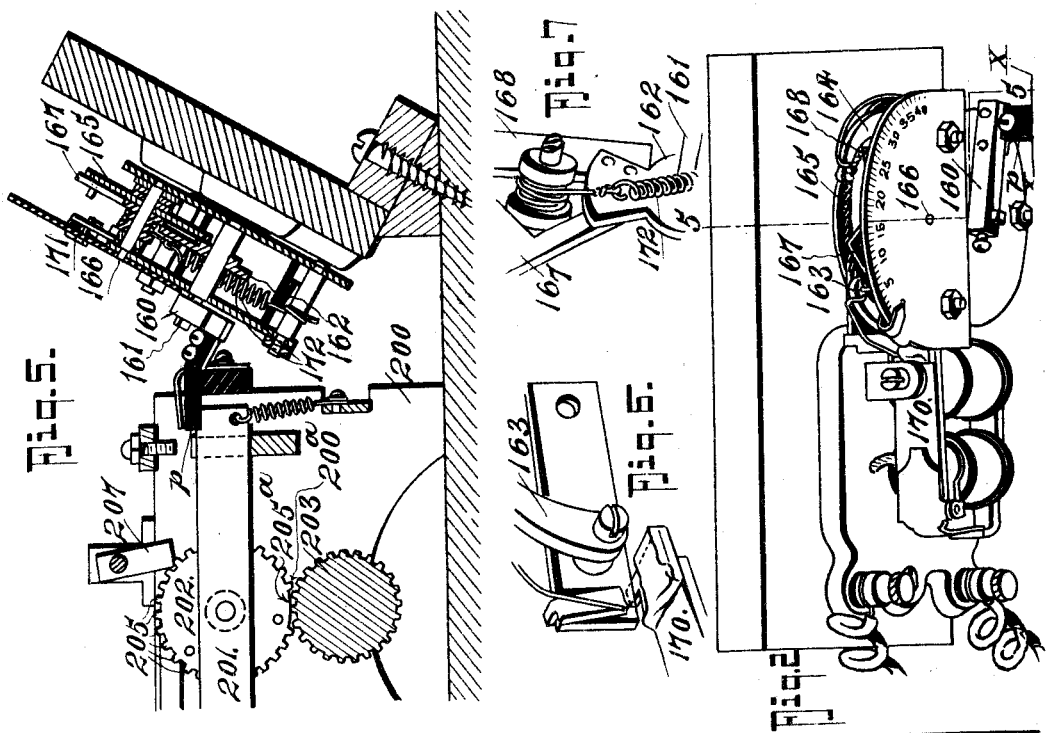
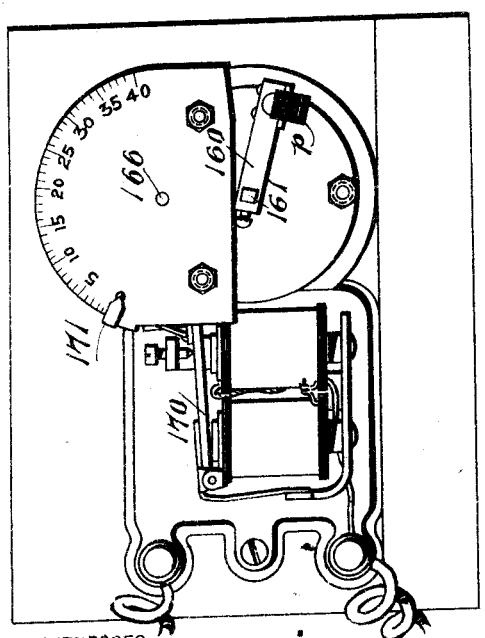
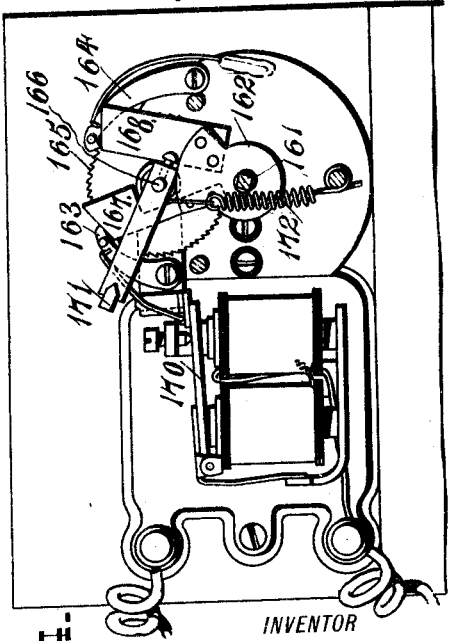

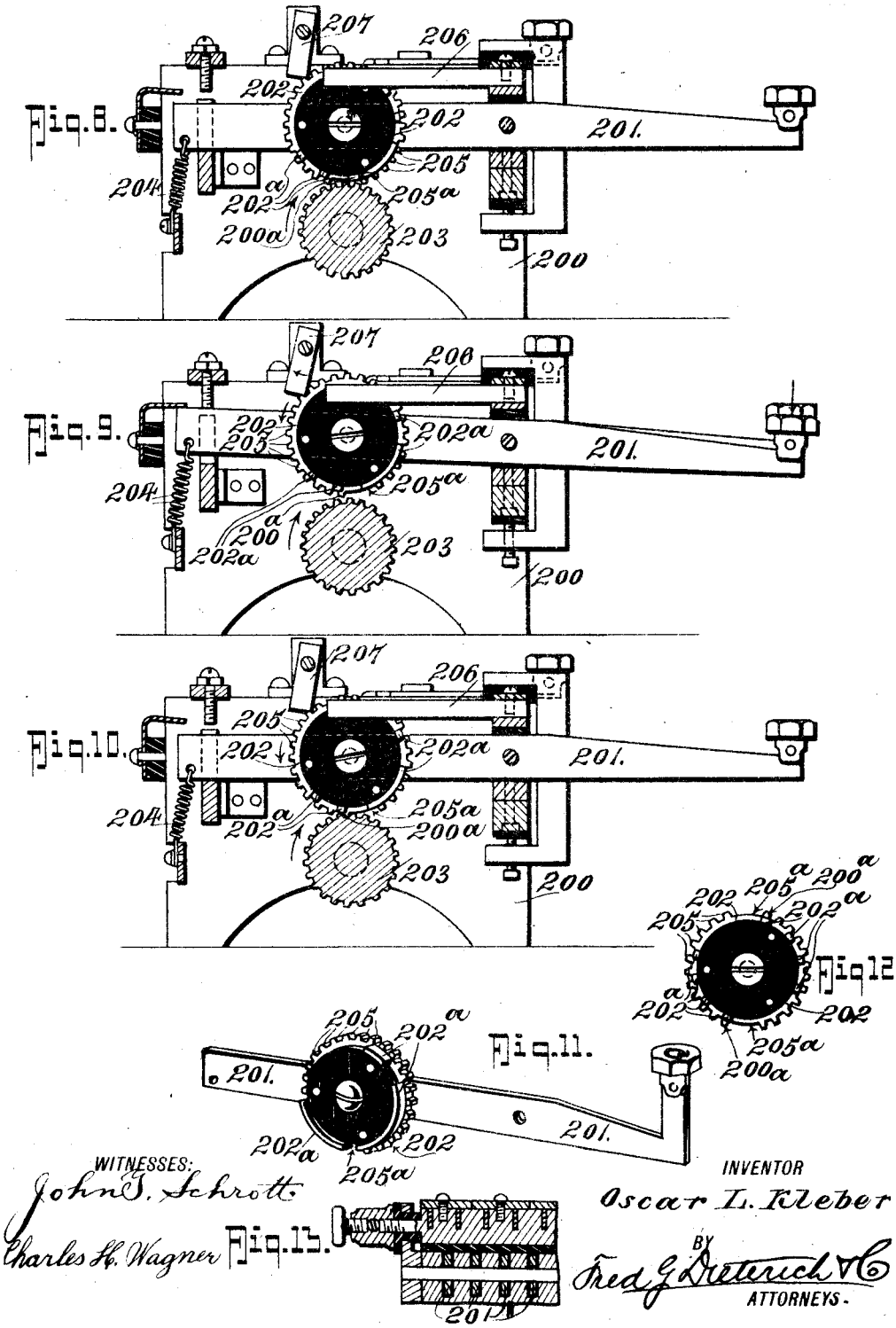

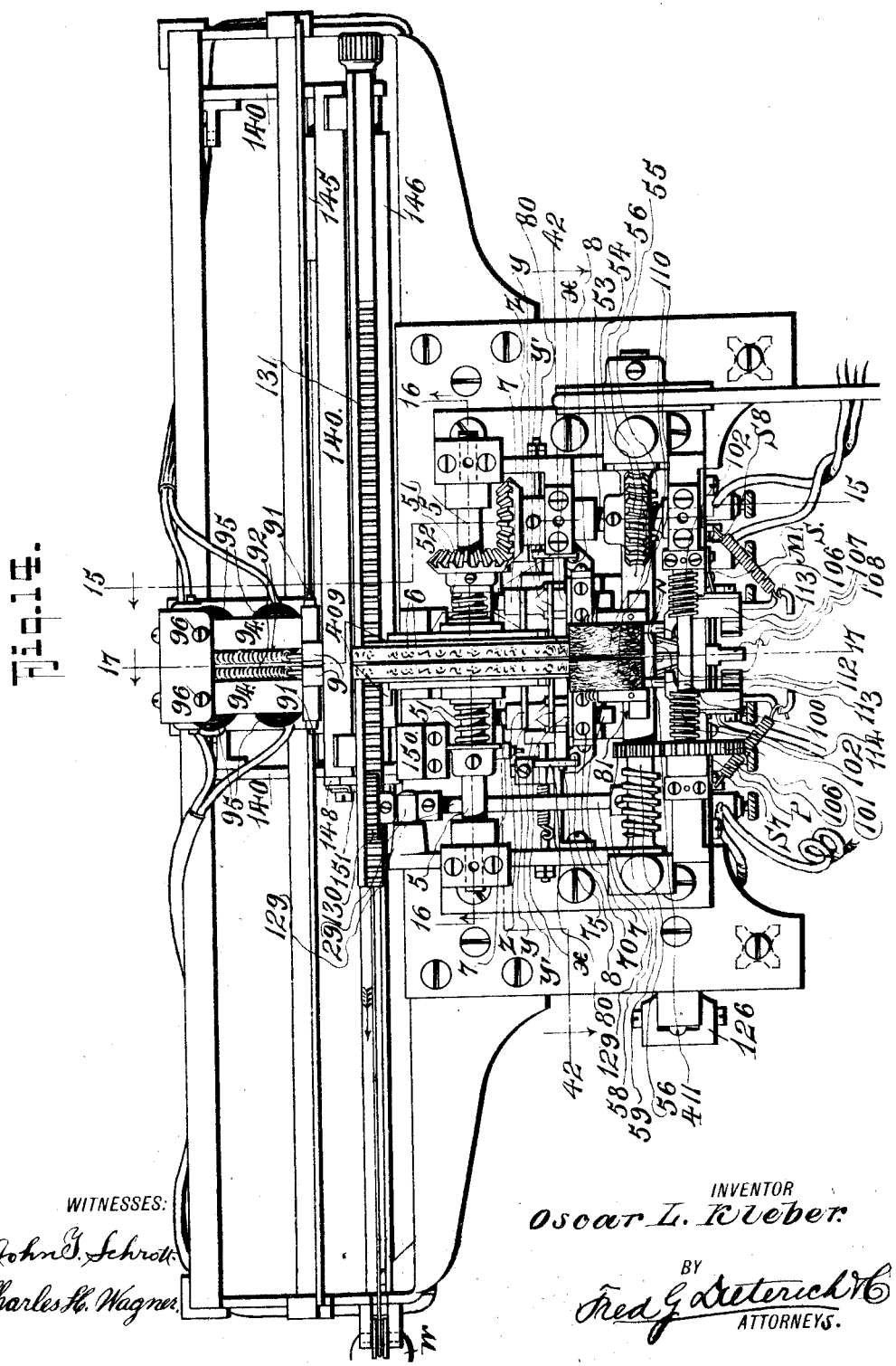

O. L. KLEBER.
PRINTING TELEGRAPH.
APPLICATION FILED MAR. 24, 1911.

1,138,958.

Patented May 11, 1915.
12 SHEETS—SHEET 5.

WITNESSES:
John G. Schrott
Charles H. Wagner

INVENTOR
Oscar L. Kleber
BY
Fred G. Dieterich
ATTORNEYS.

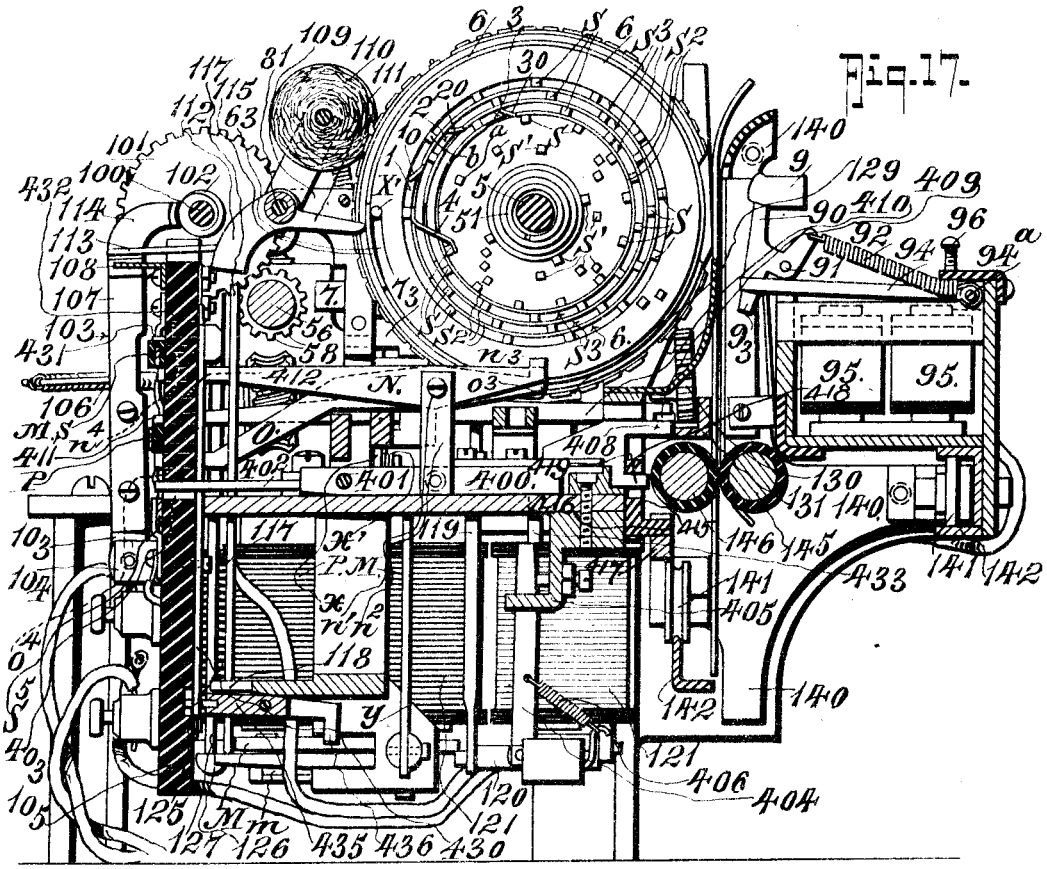
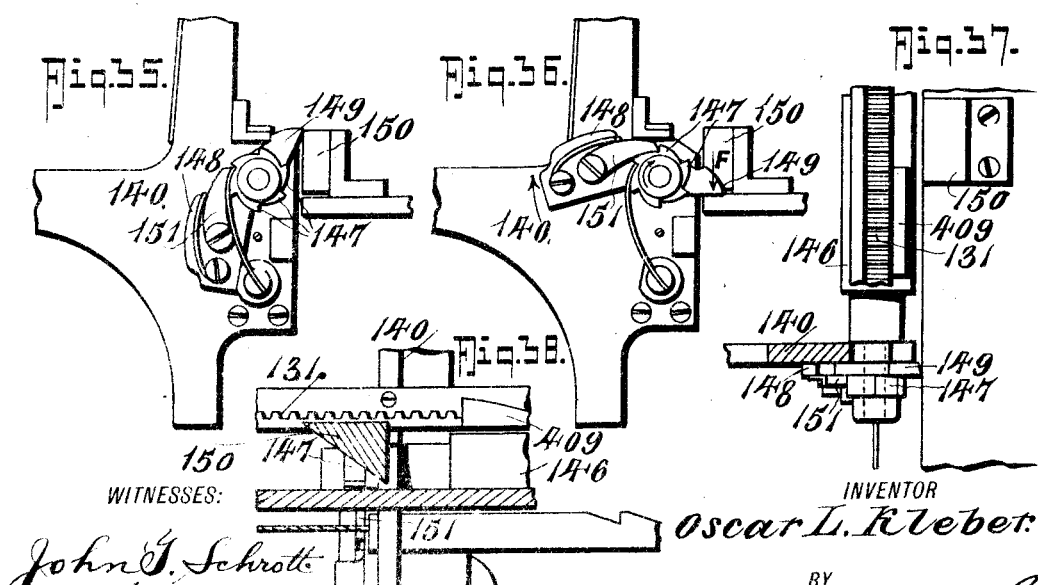

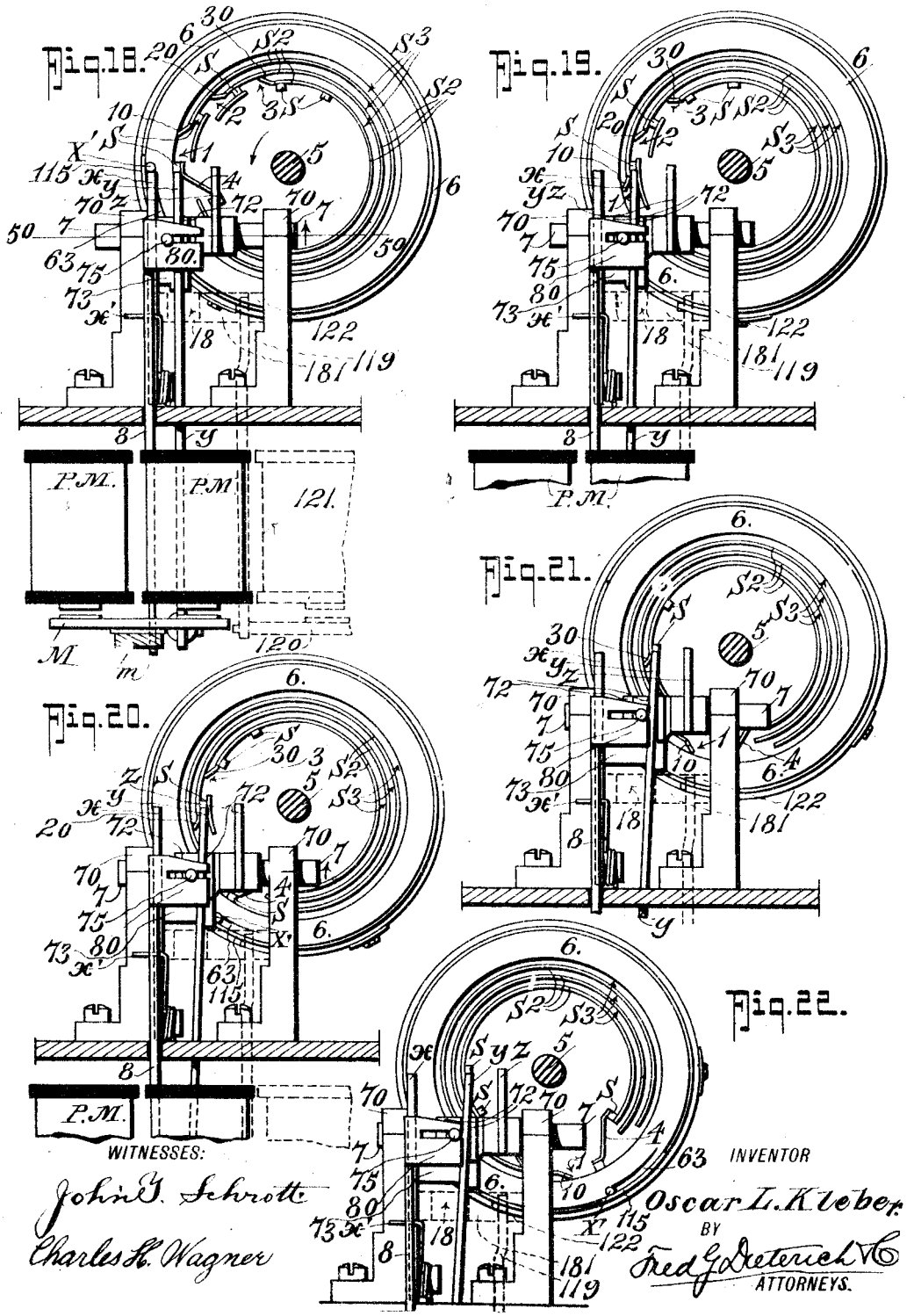

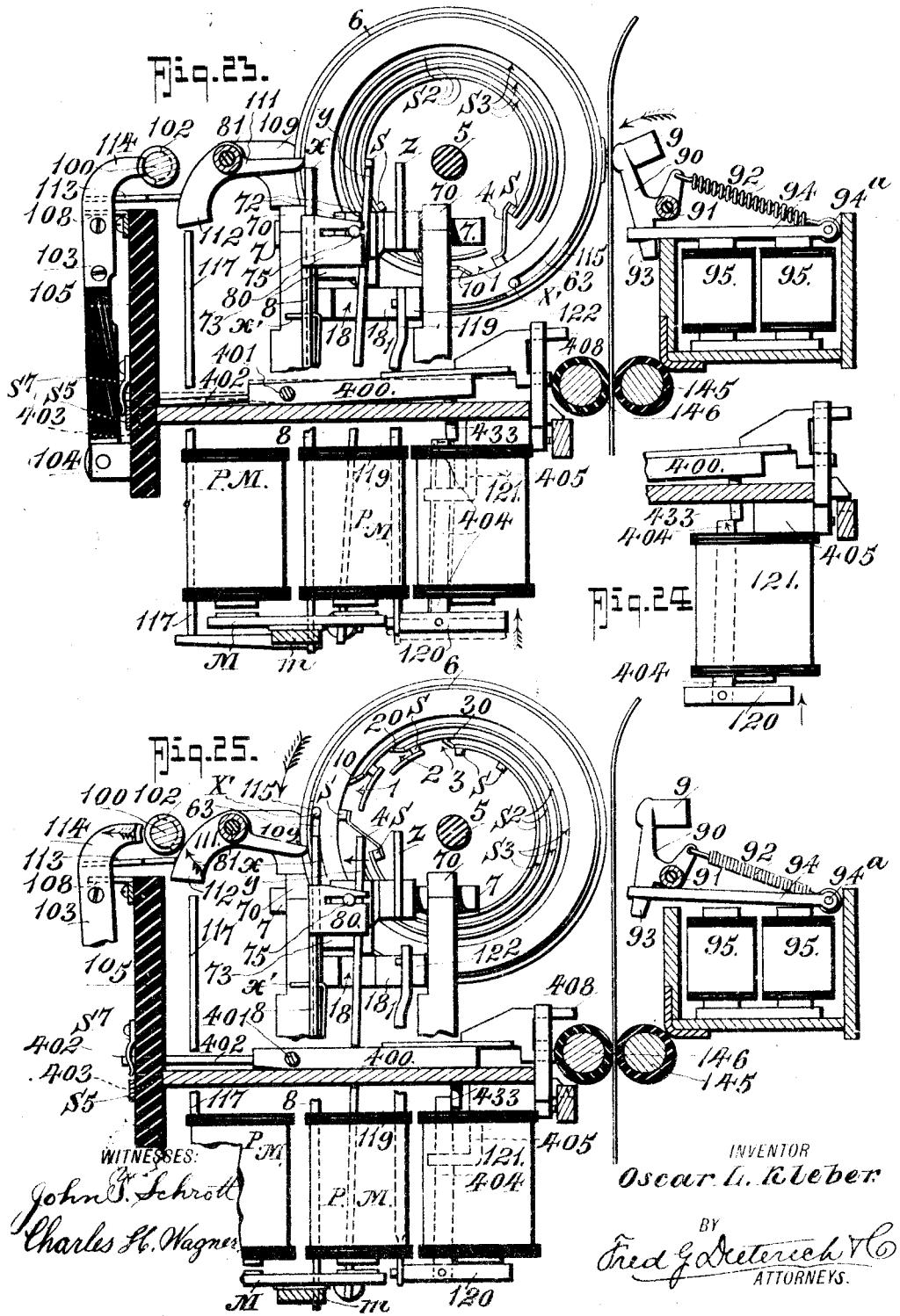

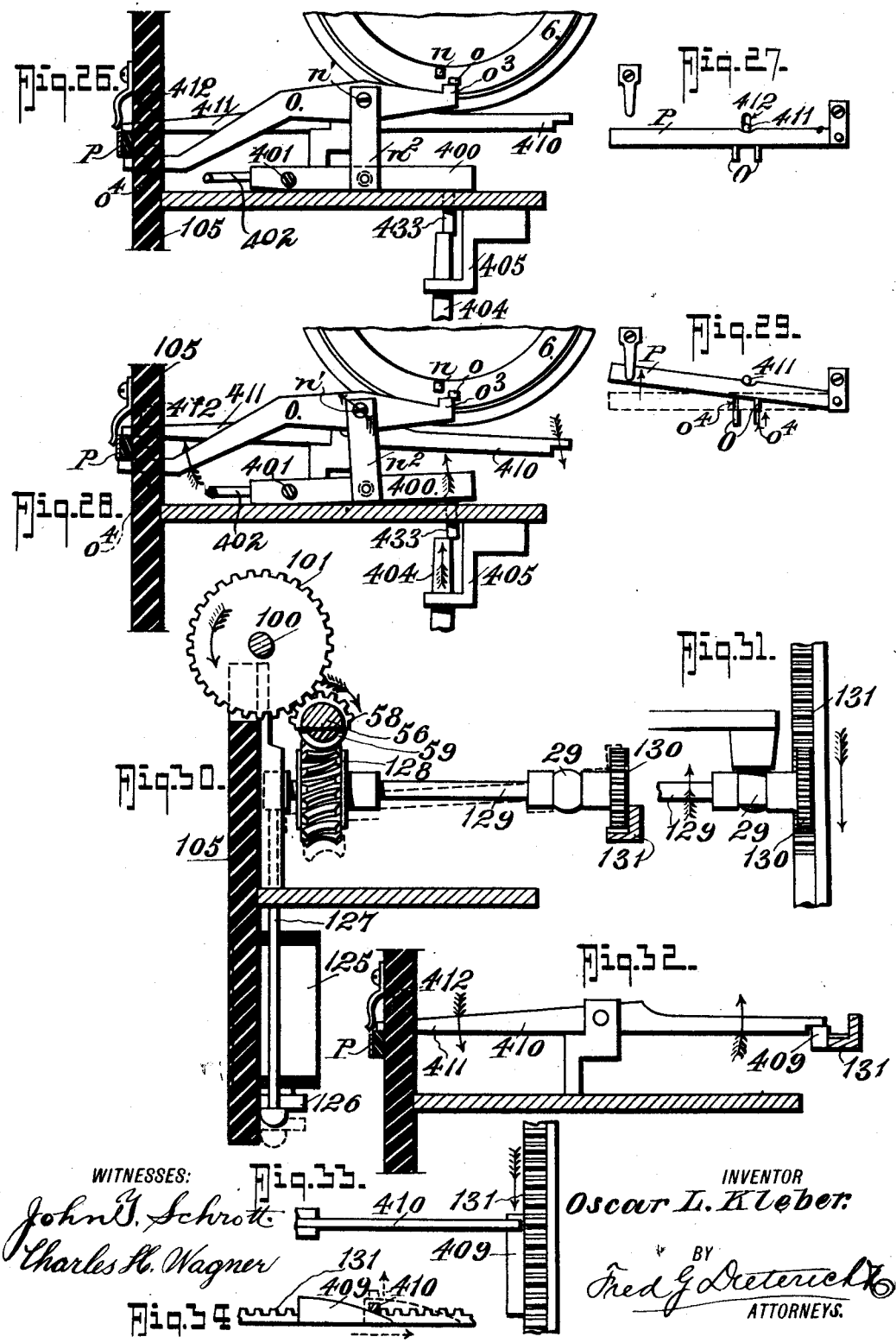

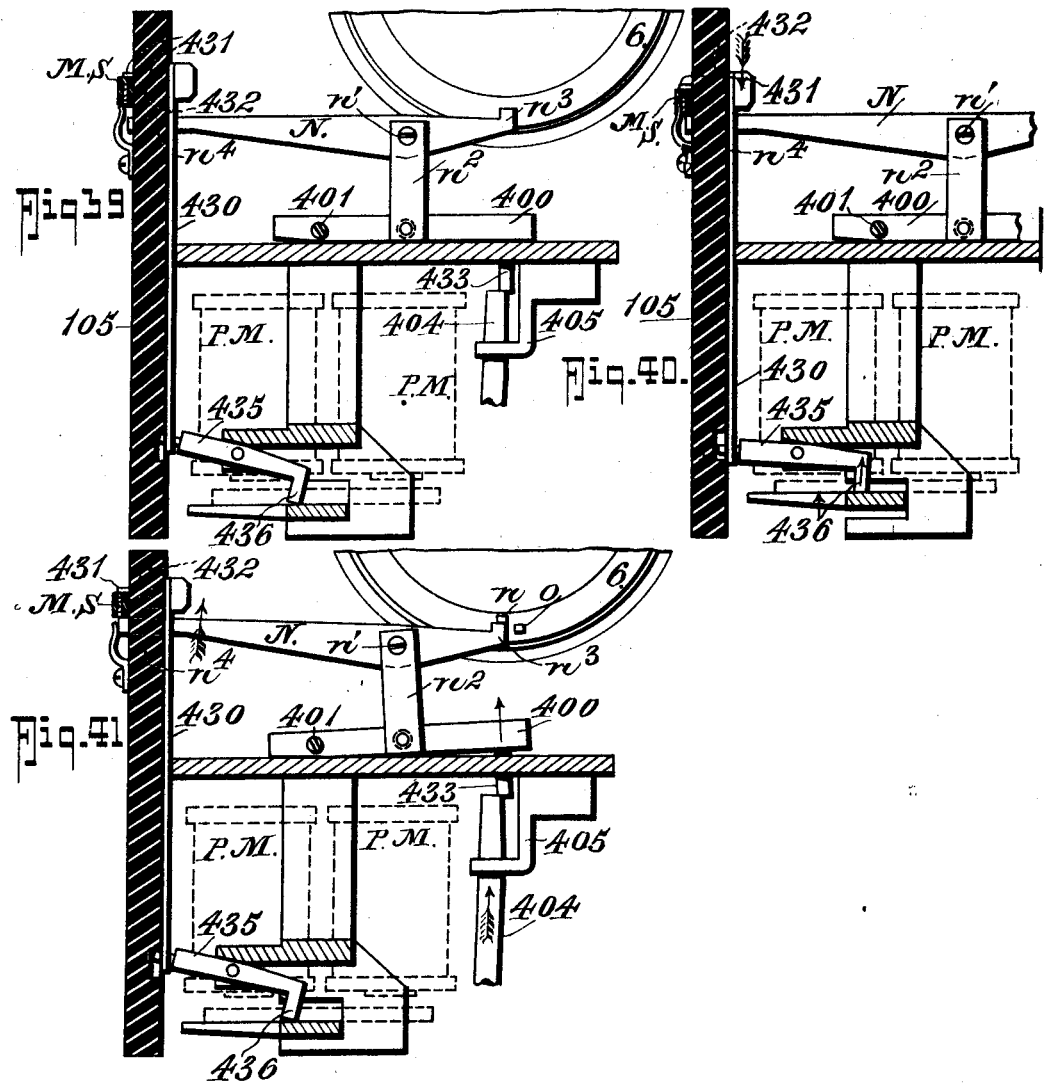

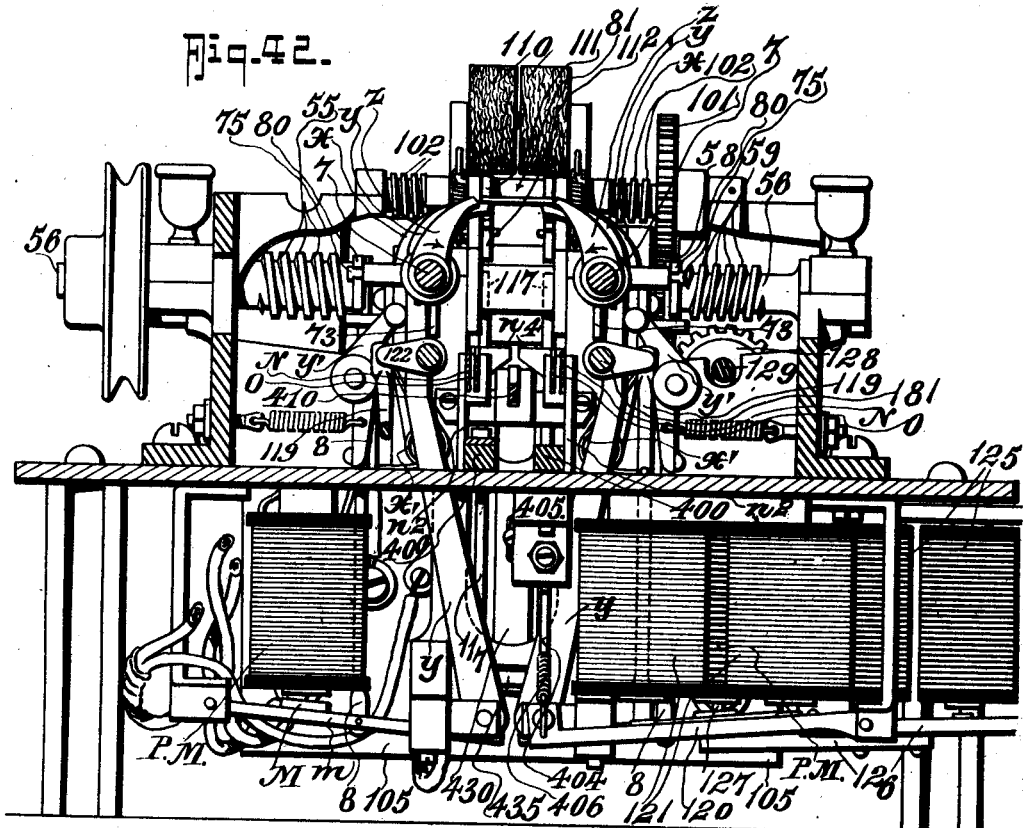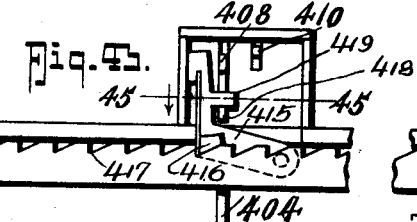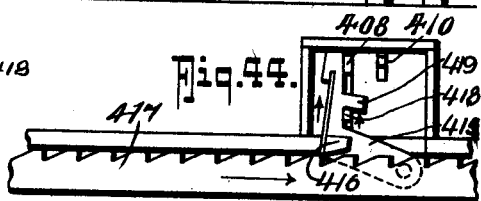

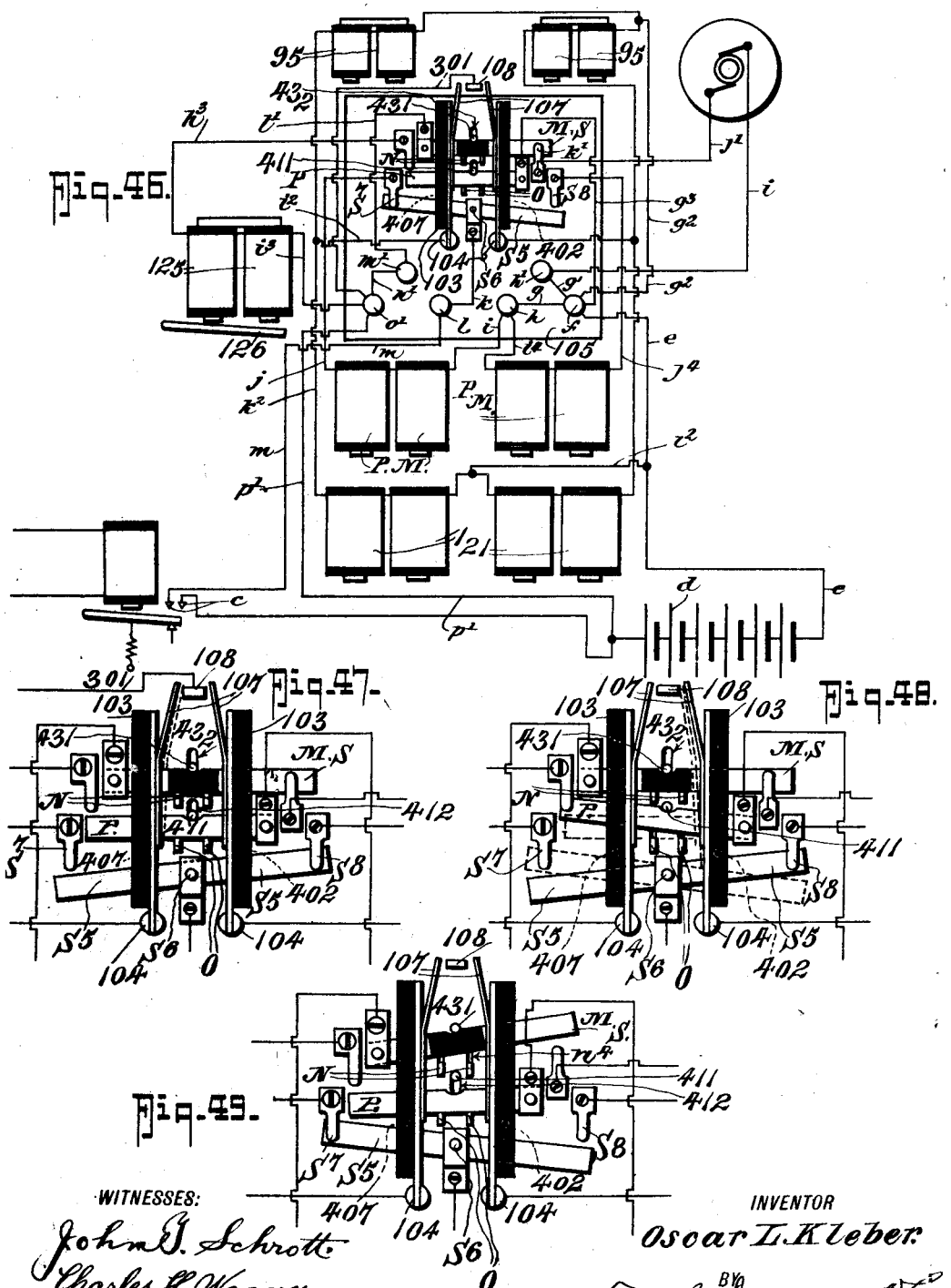

UNITED STATES PATENT OFFICE.

OSCAR L. KLEBER, OF PITTSBURGH, PENNSYLVANIA.

PRINTING-TELEGRAPH.

1,138,958.  Specification of Letters Patent.  Patented May 11, 1915.

Application filed March 24, 1911. Serial No. 616,740.

*To all whom it may concern:*

Be it known that I, OSCAR L. KLEBER, a citizen of the United States, residing at Pittsburgh, in the county of Allegheny and State of Pennsylvania, have invented a new and Improved Printing Telegraph, of which the following is a specification.

This invention relates to improvements in printing telegraph mechanisms, in which the printing elements include a rotary type wheel, and electrically controlled devices for shifting the wheel to bring it to the predetermined or desired printing position, return it to the normal position after the printing operation has been effected, the said electrically controlled devices being actuated or set in operation under the electrical impulses sent out from the transmission end of the system.

My present invention, relates more particularly to the printing telegraph system shown in my Patent No. 712,039, and that the advantages of my present invention and the construction and operative connection and combination of the parts that constitute my present system of printing telegraph be the more readily understood, I shall in a general way outline the different operative elements of the mechanism disclosed in the said patent and in a general way describe the objects of my present improvements, point out wherein the essential features of my present machine differentiate from the like features in my other mechanism or printing telegraph system referred to.

In the construction shown in my patent aforesaid, the printing mechanism hereinafter termed the "receiver" of my complete system is operated by electrical transmission of messages, said transmission for the construction shown being the Morse code of signals so that anyone skilled in the art can manipulate my printing telegraph system.

The printing mechanism referred to, comprises, generally, a shaft rotatable in the one direction, that carries two printing wheels and selecting devices for bringing the disks alternately and successively into the printing position, the selective mechanism of the wheel that was set into printing position being cut out of electrical energy as the said energy is transferred to the selecting devices for setting the other printing wheel, the shifting of the electric energy being back and forth from one type wheel selecting and setting means to the other, whereby to facilitate the taking of the signals from the transmitter, since the second signal is taken and printed by one wheel as the other wheel returns from its printing and assumes the normal position.

At this point it is particularly noted that in my patent aforesaid, the two type wheels are shiftably mounted on the shaft, and when set, are slid along the shaft so that the two type wheels come to a common printing point on the paper carriage.

One of the objects of my present invention is to simplify the action of the printing wheels by cutting out the lateral shifting of the wheels as they are set to the printing position, and arrange them to print in alinement, the paper carriage mechanism being so arranged in my present mechanism that it is fed forwardly only at the completion of each second character.

In my patented printing telegraph I utilize two sets of magnets, arranged to be brought into circuit with the single transmitting line, and magnets for shifting the type wheel selecting devices and the printing devices are energized by a normally open local battery circuit and automatically set to the closed position.

In my present case the entire printing mechanism is set in action by the ordinary interrupted circuit, technically known as the Morse circuit, the means for controlling the various switch devices being an entirely mechanical operation and so designed and coöperatively arranged whereby to eliminate the delicate adjustments common in other printing telegraph systems.

In the practical application of my patented printing telegraph disclosed in my patent aforesaid, the selecting devices, that form a coöperative part of the printing wheel, are constructed to coact with a series of circuit controlling disks of special design, see for example my Patent No. 689,889, and in the construction of the disk and the selecting devices referred to, to effect the desired operation of the system, it is absolutely necessary that the shaping of the selecting devices and the controlling disks are in positive harmony, so that a synchronous operation of the circuit control device at the transmitter end and the type wheel rotator or setting devices, occurs at all times.

While the construction of the circuit control and the type wheel setting devices in my patented printing telegraph system referred to, is practical and reliable, the use thereof necessitates a careful manufacture and accurate finishing thereof for the reason that any inaccuracy in their make-up tends to clog the quick action of the selecting devices, making repairs necessary at times and the accurate finishing of the said coacting devices in the manufacture thereof expensive.

One of the objects of my present invention is to materially simplify the construction of the selecting devices for setting the printing wheel and the circuit or energy-impulse controlled devices at the transmitting end, and to so improve the construction and arrangement of the said coöperative devices, that the necessity of a close or exact finish and coöperative adjustment of the said parts is overcome, the selective and printing devices coöperating with the printing wheel being especially so designed that inaccuracies of adjustment between the devices on the transmitter, that control the dot and dash impulses, are automatically corrected, or in other words, the impulse length may be a little or much in excess of the wave required to shift the wheel without in the slightest impairing the selecting devices or effecting the desired set of the wheel.

In my patent above referred to, the two printing or type wheels and their constituent set of operating devices, are mounted one upon each side of the printing point of the machine and the said wheels are individually and alternately first shifted laterally in position with such point when set to their respective operative positions, after which the frame that carries the set wheel with its coacting devices, is automatically swung forwardly to cause the set wheel to print the selected character.

In my present construction of printing telegraph system the two type wheels have a fixed relation with respect to the printing devices, are closely held so their printing characters are separated by a single space and so the successive printing action of the two wheels produce two characters in a proper spaced alinement.

The two wheels in my present system of printing telegraph are loosely mounted on a continuously rotating shaft operated by a motor set in action by the operator at the transmitter end when he desires to send in the message, it being understood the motor continues in action until the transmitter operator manipulates the "off" key to cut it out.

In my present construction the two type wheels are held in frictional contact with the motor drive shaft and when "released" they rotate with the shaft, the release being effected by the impulses sent from the transmitter, the degree of rotation of the wheels being controlled by the selecting or stop devices.

At this point, a very essential feature of my present improvement should be mentioned, since the same relates to the stop or selecting devices that control the set of the type wheels, and in this connection it should be stated in my former patent hereinbefore referred to, the stops with which the selecting or stop fingers coact are arranged in annular alinement and on the periphery of the selecting disk.

In the practical use of the aforesaid selecting disk having the dot stops arranged and grouped with reference to the familiar characteristics of dot and dash symbols, it is necessary that the said stops be most accurately arranged with respect to the means that actuates the stop engaging or selecting fingers, and unless a perfect correlative condition of the selecting finger actuating means and the said stops exist under a rapid operation of the system, that is, the quick sending of the impulses that make up the character, the selecting devices, at times, do not act with the desired degree of certainty.

In my present construction provision is made for overcoming the objectional feature mentioned by arranging the stops in such manner that the spaces between the stops are materially increased, the arrangement in the present case, showing four times the distance shown in my patented machine, and to provide for an accurate action of the "dot" and "dash" and stop fingers the several fingers are automatically shifted in position to engage the predetermined ones of the stops on the type wheel, the said stops and the means for shifting the fingers in the present case being mounted directly on the face of the type wheel. The present case also embodies improved devices for printing the selected character the instant the type wheel "is set" and for immediately releasing the said type wheel after printing to return to the normal position, and generally the printing devices include an electro-magnet controlled impact or hammer head that strikes the paper against the character selected and electro-magnet controlled devices that move the selecting fingers out of engagement with the set wheel, immediately after the printing hammers have been energized.

The two electro-magnet devices referred to, the printing and the release, are in the same circuit which is energized immediately the type wheel is set, the armature travel of the printing and releasing magnets being differential, the printing armature closing in advance of the release armature.

It is understood there is a printing and a release magnet for each type wheel and in the present arrangement of my printing telegraph system, when the release magnet for one type wheel is energized it acts to shift the main line circuit into the opposite set of selecting and printing mechanisms.

The paper carriage shifting action in my present case, as before stated, occurs only after the first and second type wheels have completed their movements and the shifting of the said carriage is controlled through the movement of the release armature for the "second acting" type wheel.

My present invention embodies an improved means for feeding the paper carriage, and that the general purposes and the generic arrangement thereof may be clearly understood, reference is now made to the carriage feed mechanism in my other printing telegraph mechanism disclosed in my other patent referred to. In the said patented mechanism the carriage feed is positively effected one space or notch for each character printed, and such operation is done by rack and pinion devices, the pinion being turned one tooth through the action of the electro-magnet controlled means, set in operation when each character is printed.

In the use of my patented machine, I have found that should an operator transmit an impulse during the travel of the carriage back to the normal position, done by weight or springs, it is possible to render the machine inoperative, etc., thus making the perfect highest degree of operation of one machine dependent on the careful manipulation by the operator of the transmitter.

In my present case, I have made special devices whereby the return of the carriage cannot be made until the sending operator manipulates the "paragraph" key, and in which the said carriage feed mechanism is such that when the end of the line has been reached, should the operator by reason of careless observation of his indicator, continue to send in impulses, the type wheel would simply continue to print over the same point.

In my present case, the return of the paper carriage to the beginning, is accomplished by a rack and pinion mechanism, that is set into action when the paragraphing key is manipulated by the "sender," and in its general nature the means employed is a supplemental magnet whose armature movement shifts the pinion that engages the carriage rack into and out of mesh with the rack, and in this connection, it should be stated the said supplemental or "paragraph" magnet is energized, that is, brought into the local circuit, by means of a switch that is shifted to close on the said magnet when either type wheel is set by the paragraph key, the said wheels, it should be stated when thus set present a "blank" or depressed surface to the printer which does not then act on the wheel to print, and further the wheel thus set through a stop therein engages a lever that sets the switch mentioned, the latter being again automatically shifted to cut out the supplemental or paragraph magnet when the carriage is returned to the place of beginning.

Another and important purpose of my present invention is to provide for a positive feed or blanking of the message receiving paper, and for such purpose the carriage at the end of its return thrust has a limited loose play that is utilized for acting directly on devices that engage and move the paper feed roll at each end portion of movement of the carriage.

The motor that actuates the type wheel shaft, in practice is set in operation when the first impulse is sent from the transmitter, and it is cut out by the "off" key on the transmitter, the type wheel when set by the said "off" key having a stop that shifts a switch that breaks the motor or local circuit.

Figure 16:
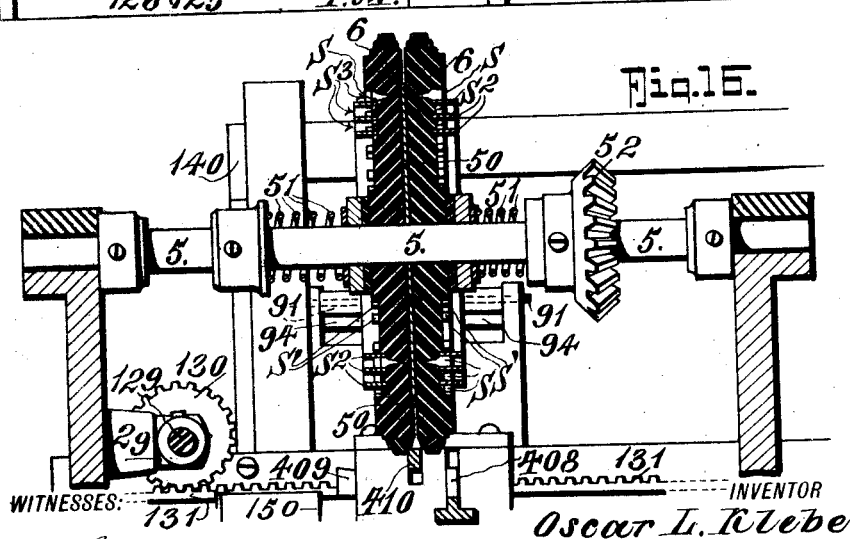

Having thus outlined the general arrangement of my present construction of printing telegraph mechanism and pointed out the main objects and differences between it and the system shown in my former patent referred to, I shall now describe in detail the various sub-mechanisms and combination of parts, all of which are disclosed in the accompanying drawings in which:

Figure 1, is a plan view of the transmitter portion of my present printing telegraph system. Fig. 2, is a plan view of the indicator devices used in connection with the transmitting mechanism, line X—X on this figure indicating the position X—X on Fig. 1. Fig. 3, is a face view of the indicator devices, the indicator finger being at zero. Fig. 4, is a similar view, the dial plate being removed. Fig. 5, is a cross section thereof on the lines 5—5 on Figs. 1 and 2. Figs. 6 and 7, are detail views of parts of the indicator devices hereinafter referred to. Fig. 8, is a cross section of the transmitter mechanism, on the line 8—8 on Fig. 1, the parts being at their normal position. Fig. 9, is a similar view, the key being shown depressed. Fig. 10, is a like view, the key being at the return position, the transmitter disk being shown as moved into mesh with the continuously rotating drive gear. Fig. 11, is a detail view of one of the keys and its attached transmitter disk. Fig. 12, is a detail view of the letter "H" transmitting disk. Fig. 13, is a section on the line 13—13 on Fig. 1. Fig. 14, is a plan view of the message receiving and printing mechanism, the parts being at their normal position. Fig. 15, is a transverse section on the line 15—15 on Fig. 14. Fig. 16, is a cross section on the line 16—16 on Fig. 14, and particularly illustrates the frictional movement of the two type wheels. Fig. 17, is a transverse section on the line 17—17 on Fig. 14. Fig. 18, is a detail view of one of the type wheels and the selecting mechanisms, the wheel being at the normal or "rest" position. Fig. 19, shows the position of the same parts after the first dot impulse for the character "H" has been sent in. Fig. 20, shows the position of the parts after the second dot impulse has been made. Fig. 21, shows the same parts in the position of the parts after the third dot impulse has been transmitted. Fig. 22, shows the same parts in the position they assume after the fourth dot impulse has been transmitted and the letter "H" has been brought to the printing position. Fig. 23, shows the parts illustrated in Fig. 22 with the printing and printing control magnets, the said parts being shown at the printing position and the release magnet armature far enough advanced to shift the switch for shunting the local current to the other type wheel and printing mechanism. Fig. 24, is a diagram of so much of the release magnet, the slip pawl devices, the switch breaking lever and the carriage rack engaging pawl necessary to show the carriage pawl as disengaged from the rack as the release pawl about completes its up thrust. Fig. 25, is a similar view of the same parts, showing the type wheel released and returning to the normal position and the switch shifting lever as freed from the release magnet armature action. Fig. 26, is a diagram that illustrates the type wheel as having been moved under a paragraph key impulse. Fig. 27, is a diagram of the position of the paragraph switch when the parts are as in Fig. 26. Fig. 28, shows the parts shown in Fig. 26 shifted under the release magnet energy to close in the switch to the paragraph magnet circuit. Fig. 29, indicates the position of the paragraph switch referred to in Fig. 28. Fig. 30, illustrates the gear mechanism set in action when the paragraph magnet is energized for running the carriage back to normal position. Fig. 31, is a top plan of the rack and pinion connections shown in Fig. 30. Figs. 32, 33 and 34, illustrate the devices for opening the paragraph switch when the paper carriage returns to the normal position. Figs. 35, 36, 37 and 38, are detail views of the means for feeding the paper and for a new line, as hereinafter specifically referred to. Figs. 39, 40 and 41, are diagrams that illustrate the manner in which the motor circuit is cut in and cut out. Fig. 42, is a transverse section on the line 42—42 on Fig. 14. Figs. 43, 44 and 45, are detail views of the carriage rack check pawl mechanism. Fig. 46, is a diagrammatic view illustrating the position of the switch levers when an initial character impulse is about to be sent. Fig. 47, is a similar view showing the local circuit switch lever shifted to shunt the current to operate the opposite type wheel mechanism. Fig. 48, is a similar view showing the paragraph switch thrown in to return the paper carriage to its normal position. Fig. 49, is a similar view, the parts being positioned as when the "off" key is depressed. Fig. 50, is a detail cross section on the line 50—50 on Fig. 18. Fig. 50ª is a detail cross section taken on the line a—a on Fig. 50. Fig. 51, is a detail view hereinafter referred to.

In describing the details of construction of the parts that constitute my present printing telegraph system, I shall take up, so far as possible, the various sub-mechanisms, in the order in which they come into action after the first impulse is sent from the transmitter, the detailed description of which will also hereinafter appear.

*The type wheel and selecting mechanism.*—Referring now more particularly to Figs. 15 to 22, 6—6 designate the two type wheels and since each coöperates with an independent set of selecting devices, a detailed description of one type wheel, and its coöperating devices, will suffice for both. Wheel 6 has the symbols, signs, letters, characters, etc., such as usually employed in the ordinary telegraphic codes and in the present case it also has blank portions for the spacing, paragraphing, on and off, impulses, from the sender, so no printing takes place when the aforesaid impulses are sent to the receiver. Wheel 6 is loosely mounted on a shaft 5 but is held in frictional contact therewith, the shaft having a friction disk 50, against which the wheel is normally held by the coil spring 51, the frictional engagement of the wheel and shaft being such, that when released from any of the stop devices that hold the wheel from movement it will positively move with the said shaft 5 which is continually rotated, while the system is in action, through the medium of the bevel gear 52, that meshes with a countershaft 53 that carries a worm gear 54 held in mesh with a worm 55 on the motor driven shaft 56, the several shafts referred to being mounted in a suitable framework, mounted on a main bed, in the manner clearly understood from the drawings.

The character selecting mechanism that controls the set of the type is best shown in Figs. 18 to 22, by reference to which it will be noticed the face of the disk has laterally projected lugs that form the stops with which, at predetermined times, the predetermined one of the selecting fingers engage, there being three of such fingers, the stop finger *x*, dot finger *y* and dash finger *z*. In the present showing, the wheel 6 has as many stops as are characters on the wheel rim, and these are designated—S, the "dot" stops, and S' the "dash" stops. To provide ample time for the fingers y and z to drop back in position to engage with the said dash and dot stops between the impulses from the sender, the said stops S—S' are arranged in a plurality of concentric rows, four being shown, it being understood that the number of such rows may be more or less, it also being clear that the greater the number of rows of such stops, the greater the distance between the stops of each row. Coöperating with the said rows of dot and dash stops are a number of concentric rows of flanges S², that form annular grooves S³, in which are located the second and third rows of dot stops, and the said flanges and grooves form the means for shifting the fingers y and z in proper position to engage with the respective rows of dot and dash stops, it being obvious that since the fingers y and z are reciprocated laterally in unison, no flanges or grooves for the dash stops are needed.

The type wheel 6 is held to its normal returned position by the stop finger x which, when the wheel rotates with the shaft to the normal point, drops into a long segment groove 63 in the outer edge of the wheel and thus holds the wheel from turning with the shaft until it is again released in the manner presently explained.

At a predetermined point, hereinafter called the starting point, the flanges S² are cut out, the cut out portions designated 1, 2, 3 being relatively so arranged and so combined with three oblique guide portions 10, 20, 30, that the dot stop finger y, after it has been released from engagement with any one of the first row of dot stops, is shifted, (with the other finger z) to the next position, that is, in line to engage with any selected one of the second row of dot stops, and in case the character selected is formed of three dots, the two fingers are again shifted to bring the dot finger y in line with the third row of dots, the same operation of shifting the fingers following to bring the finger in line with the fourth row of dot stops in the wheel, if the character to be selected is made of four impulses or dots. The operation of setting the dash finger z and for selecting the desired dash stops on the type wheel is the same as explained for the dot stop selecting devices.

By reason of the peculiar arrangement of the wheel with the stops arranged in different rows and the means thereon for shifting the selecting fingers, provides for economically making the type wheel and the selecting mechanisms, and materially cuts down the necessity of accurate adjustment of the most delicate parts of telegraph printing mechanisms, and particularly in the adjustment of the selecting means actuated under the long or dash impulse.

As before stated, in this art it has been necessary to provide for an accurate arrangement of the stops for controlling the rotary throw of the type wheel in getting the desired character in place and particularly so for the selecting devices actuated under the dash impulses. In this art, the transmission of the dot and dash impulse is usually effected by a rotary disk having means to make the circuit to the receiving end of the system, and the dash impulse is usually made by a long wiping contact of the circuit terminals through the transmitter disk. In the mechanism disclosed in my Patent #712,939, before referred to the space between the dash stops with which the dash finger z coacts, must be substantially that of the length of the wiping contact at the transmitter end. By reason of arranging the stops on the wheel in the manner hereinbefore described, no such rotative adjustment between the transmitter and the selecting dash stops in my present system is required, since the distance between each dash stop in each row of such stops is alike and positive, and hence the moment the dash controlling disk of the transmitter is energized, the dash stop selecting finger picks up the required dash stop and holds the wheel, irrespective of the wiping or length of the dash impulse at the transmitter. This arrangement of parts is very advantageous, since it effects much saving in the cost of manufacture of the receiver, and does away with much hand fitting and accurate correlative arrangement of the circuit breaker disks at the transmission end (hereinafter fully explained) and the selecting mechanism.

Briefly outlined the operation of my present printing telegraph is explained as follows: In sending letter "H," made by four short impulses, or dots, from the transmitter, the finger y is intermittently lifted (as hereinafter explained) four times, and likewise drops successively in line with the second, third and fourth rows of dot stops on the wheel, and selecting after its fourth lift the "H" stop which is in the fourth row of stops on the wheel, see Fig. 22. During the successive four releases of the finger y, the type wheel, by reason of its frictional engagement with its motor driven shaft, turns with the shaft, it being understood the said forward movement being four very quick successive movements, and the degree of movement such that the character "H" on the wheel is brought into the printing position.

*The selecting finger's controlling mechanism.*—Referring again more particularly to Figs. 18 to 22 and to Fig. 42, it will be noted the fingers x, y, z, coöperate with a rock shaft 7, loosely journaled in bearing boxes 70—70 on the framing, and to the said shaft the dash finger z is fixedly held so it rocks with the shaft into or out of engagement with the stops side of the type wheel. The stop and dot fingers x—y have pendent shanks and they are hinged at the lower end, a spring x' normally engaging the stop finger to force it inwardly. The upper ends of the fingers x and y seat loosely in recesses 72—72, formed in the side of the rock shaft 7, and in such manner that when the said shaft 7 is rocked in the direction of the arrow, see Fig. 42, as presently explained, the face 73 of the shaft acts as a cam (see Fig. 50ª) to swing the fingers x—y to release them from the wheel stops, it being understood since the dash stop is fixed to the shaft it rocks inwardly as it is the only one of the three fingers that is moved into a selecting position when the impulse is set into the primary or main magnet. To prevent the dot finger being thrown back too far a yielding abutment y' is located back of it, see Fig. 42. This yielding abutment is also limited in its forward thrust so that when the dot finger y is normally positioned there is no spring pressure on it, and hence, it is freest to move laterally when engaged with one of the flanges, 10, 20 or 30.

The release and apply movements to the several fingers are effected by the primary or main line magnet P. M., there being one set of such magnets for each wheel and its coacting devices, the armature M forming a lever to which is connected the lever rod 8, that has a bifurcated finger 80, in which rides the crank pin 75 of the rock shaft 7, it being clear from Fig. 18 that the variable impulses of the armature lever m control the movement of the selecting and stop fingers x—y—z. The stop finger x, it should be stated, does not shift laterally, but retains a fixed relation to the wheel face, it being in line to ride on the face of the said wheel and drop into the long segment groove 63 to engage the stop X' that holds the wheel at the rest or normal position. The face of the type wheel has a long oblique flange 4 located in advance of the first break or separation of the annular guide flanges, which, when the wheel is released and travels under the release action engages the dot finger y and shifts it together with the dash finger z back to normal position, see Fig. 25.

Another and important advantage gained by arranging the selecting fingers and the dot and dash stops on the type wheel as described and shown is, that the actual step-by-step movement of the type wheel is positively controlled by the dot stops only, thus making an absolutely accurate relation of the dash stops with the printing characters on the wheel unnecessary.

It will be noticed by reference to Figs. 15 and 17 of the drawings, the dot stops are arranged a little back of, that is,—lag behind the dash stops, and by reason thereof and further since the shaft 7 when the impulse through the primary magnet is ended, is rocked to bring the dash finger away from the wheel face, and as the dot finger under such movement goes in the opposite direction and drops onto the face of the wheel, it comes into position to catch the dot lug that lags behind the dash lug that finished the selection of the character to be printed and holds the wheel to such position, thus leaving the dot finger the only one to be released after printing.

By referring to Figs. 18 to 25 inclusive, the operation of printing the letter "H" will be explained, the letter "H," in the Morse telegraphic code, consists of four dots or four electric impulses sent in quick succession. When the type wheel 6 and its coacting stop, dot and dash fingers x, y, z, are at rest or at normal position, their relation is as shown in Fig. 18. Should it now be desired to transmit the letter "H," the first electric impulse will energize the primary magnet P. M., draw armature M up, thus rocking shaft 7 through the connection 8, which shaft 7 when rocked (see arrow Fig. 42) will swing stop and dot fingers x—y away from the face of the type wheel through the medium of their engagement with the flattened portion of the recesses in which they seat and also the pendent face 73 (Fig. 50ª) while the dash finger will swing inwardly toward the type wheel, this first aforesaid electric impulse having thus released the wheel 6 from the stop and dot fingers is free to rotate in the direction of the arrow (Fig. 18) until the first dot stop adjacent the cutout portion 1 strikes the dot finger y, which in the meantime, together with the other two fingers, has assumed its original position, the first electric impulse having ceased, permitted such return, the parts being now positioned, as in Fig. 19. When the second electric impulse is now sent in, the identical movement of the stop, dot and dash fingers takes place again releasing wheel 6 for further rotation until the stop, adjacent cutout portion 2 strikes stop finger y, said finger gradually moving in toward the center of the wheel, such inward movement being accomplished by the oblique guides 10—20—30, which engage the aforesaid finger y during the rotation of the type wheel and move the finger inwardly. The parts are now in position as in Fig. 20. The third impulse carries the type wheel and coacting fingers through the same cycle of operation, positioning the finger y against the dot stop adjacent the cutout portion 3, as in Fig. 21. The fourth electric impulse completes the sending of the character "H" and will position the finger y, as in Fig. 22. When the electric printing impulses cease to come over the main line and the dog 111 (Fig. 23) drops, it having been supported during the sending of the character "H" impulses by the vibrating rod 117, the switch arm 103 engages worm 102 and is carried into contact with terminal 108 (dotted position Fig. 48) where the local circuit is closed and the printing magnet 125 at the right side of Fig. 46 performs the printing function (see right of Fig. 23), and since the releasing magnets 121 (right side of Fig. 46) are in parallel circuit with the printing magnets, the releasing action occurs immediately after the printing is complete the slight retardation of the action of the releasing magnet being accomplished by causing the releasing magnet armature to travel through a greater distance and thus delaying its action for a fraction of time. Simultaneous with the releasing action of the last named magnet 121, the switch S⁵ is shifted to the dotted line position (Fig. 48) to transfer the local current to the other side of the receiving and printing mechanism where a similar cycle of operation as above described is repeated.

Fig. 23 shows the armature of the magnets 121 in the act of reversing the switch S⁵, through the medium of lever 400 and its appended parts, at the same time rotating shaft 181 through the medium of the plunger 119 and crank 122, thereby causing the flattened portion 18 to swing finger y away from the wheel 6 which now being entirely free, rotates nearly to its first position, which when nearly reached is again engaged by finger y in time to be engaged by the diagonal portion 4 (Fig. 25) when said finger y and its coacting finger z are returned to the position in Fig. 18. Should, for instance the character "N" be transmitted, it being composed of a dash and dot; the first electric impulse being a dash, the finger y is held out long enough to allow the oblique portion 10 to pass under it, and the dash finger z will in the same movement engage the face of the type wheel and consequently the first dash stop a (Fig. 17); the dash impulse having ceased, finger y moves into the outer groove while dash finger z rests, thus releasing the wheel which will then have slight added rotation, moving until finger y engages the first dot stop b, in the aforesaid outer groove when the printing, releasing, etc., operations take place.

*The printing mechanism.*—In my present telegraphing system, the paper is preferably fed up from a roll over the platen or carriage that moves the paper step-by-step and in proper alinement over the printing face of the wheel. In the printing mechanism, best shown in Figs. 17, 23, 24 and 25, the printing is effected by impact of a hammer or printing head 9, that is swung over against the paper and the character behind it, the instant that the wheel character has been set. The hammer 9 is mounted on the upper end of an angle member 90, rockably held on a suitably held cross rod 91, and which is normally swung to its back position by a spring 92. The angle member 90 has a pendent portion provided with a lateral lug 93 that engages the under side of the outer end of the armature lever 94 of the electro-magnet 95, the lever being hinged at 94° and normally held up by the pulled-back position of the lug 93, the degree of position of the lift of the armature lever 94 being controlled by the regulating screws 96, as shown, see Fig. 17.

103 designates a switch lever, the lower end of which is mounted on a binding post 104 rockably mounted in the front wall 105 of the framing, and which is hinged on the said post to swing to and from the worm said post with which it coacts, and the said lever is normally rocked back to its normal or first position and pulled toward the worm 102 by a coiled spring 106. At one side the lever 103 has a spring plate contact 107 which, at predetermined times, engages the terminal 108 which closes the circuit through the printing and releasing magnets, when the contact 107 is moved into engagement with the contact 108 such operation being explained as follows: Upon a shaft 81 mounted in brackets 109, and on which the inking rollers 110 are mounted, is loosely hung a dog 111 having a pendent and weighted heel 112 that engages a lateral finger 113 on the upper end of the lever 103, the arrangement of the finger and the heel 112 being such that so long as the heel 112 engages the finger 113 the hook extension 114 of the lever remains out of engagement with the worm 102. When the type wheel 6 is at rest, a peripheral lug 115, on the said wheel engages the lever 111, and holds the weighted end swung out against the finger 113 of the lever 103, and thus keeps the extension 114 out of gear with the worm 102.

*The release mechanism and the control for the release and printing magnets.* Referring again to Figs. 17, 18, 50, it will be seen that the main shaft 16 carries a pinion 98 that meshes with the larger gear 99, said gear continuously rotates the shaft 100 mounted on top of the framing parallel with the shaft 3 and which has the worm gears 102 (one for each set of operating mechanisms) with each of which coacts a switch 103, as previously described. During the period the wheel is moved to bring the desired character into a printing position, the circuit to the printing and release magnets must be main broken and since the cam on the wheel when the latter starts on its rotation, disengages the lever 111, other means must be provided to hold the switch lever 103 out of the worm, until the character has been set to the printing position. For such purpose, I use a vibrating rod 117, loosely mounted on the outer end of the primary or main line magnet armature, and the said rod is guided in bearings 118 on the main frame so that its upper end engages the under side of the heel member 112, the lower end thereof resting on the armature, as shown. By the said arrangement of parts it is obvious that the repeated impulses on the magnet vibrate the heel member 112, keep it up, and in consequence holds the switch 103 out of mesh with the worm and so soon as the sending impulses cease, the heel will drop and allow the switch hook member 114 to move into mesh with the worm 102, and thereby carry the lever over to make contact with the member 108 to close in the circuit to the printing and the wheel releasing magnets, the lever remaining at the contact making position until the wheel has been released and returned to the normal position, and the cam 115 on the said wheel engages the lever 114 to move it up, the latter, when thus moved throws the switch 103 outwardly and holds it there.

It should be stated that while the printing and releasing magnets are simultaneously energized, the armature movements of the said magnets are so timed that the printing action occurs in advance of the releasing action.

The releasing of the wheel is effected by a second notched rock shaft 181, the notch 18 of which receives the dot finger, the only finger that holds the wheel after the character is formed, the shaft 181 when rocked, acting as a cam to swing out the finger y and releases it from the type wheel. The shaft 181 is rocked by a rod 119 that extends up from the armature 120 of the release magnet 121 and connected with a crank finger 122 on the shaft 181, as will be clearly understood by referring to Figs. 23 to 25.

*Paper carriage and feed mechanism.*—As before stated, in my present machine, the paper carriage is moved after the two wheels have each printed a character, that is, after each two characters are printed, and the degree of movement of the carriage being a double space movement. For returning the carriage to normal, a single paragraphing magnet 125 is used, whose armature lever 126 carries a plunger rod 127 the up-movement of which sets in operation the drive gear for the carriage.

Referring now particularly to Figs. 30 to 34, of the drawings, 59 designates a worm on the motor shaft and 128, a worm gear on a cross shaft 129 that has movement vertically with respect to the gear 59 so that under the up-movement of the plunger rod 127 it is thrown into mesh with the gear 59 and when the impulse through the magnet 125 is broken and the rod 127 drops, it, the gear 128, drops out of connection with the motor shaft. In practice, the gear 128 is held in frictional contact with its shaft 129 so that should the paper carriage mechanism be hung up or the paragraphing magnet fail, the gear will slip on the shaft 129, and thereby overcome danger of parts of the machine being broken or thrown out of operative connection.

Shaft 129 is mounted in a rock bearing 29 and the said shaft 129 has a cog gear 130 that normally disengages the rack bar 131 of the carriage, it being obvious that when the shaft 129 is disengaged from the motor shaft, during the operation of automatically feeding the carriage forwardly (see weight W) while sending characters, the gear 130 and shaft 129 rotate loosely backwardly. When the carriage is at the end of a line or a new paragraph is to be started, and the "paragrapher" has been operated, the said gear 130, by reason of its now being positively driven from the motor shaft, feeds the carriage back quickly to the place of beginning, it being obvious that the extent of the back throw or movement depends on the length of the "paragraph" impulses.

The carriage 140 is reciprocably mounted on the framing and in such manner that the paper is moved between the printing rim of the wheels and the printing hammer head and to facilitate the free movement of the carriage it is mounted on rollers 141—141 that ride upon the rail or rack bar, as shown.

By referring more particularly to Fig. 14, on which the arrow indicates the direction of movement of the carriage under tension of the weight W when sending in character impulses, and Fig. 30, in which the dotted position indicates the driving shaft 129 that operates to move the carriage backwardly out of its operative condition, that is,—the gear 130 is now out of mesh with the carriage rack 131,—and the full line position in the said Fig. 30, indicates the said shaft 129, which is shifted into its operative position when the paragraphing magnet 125 is energized and shows the said gear or pinion 130 in mesh with the rack 131 to move the carriage backwardly and against the tension of the weight W, the extent of such backward movement depending upon the length of time that the magnet 125 remains energized under electric impulses from the paragraphing key.

Referring now to Figs. 17 and 35 to 38, it will be noticed that the paper feeding devices that feed the paper lengthwise includes the opposing rollers 145—146 having yielding faces for engaging the paper sheet, the latter being suitably guided at the upper end to pass between the printing wheel and the printing hammer, as clearly shown. One of the said rollers 146 has the usual finger head, (see Fig. 14) for turning it by hand, and at the opposite end, the shaft of the said roller 146 carries a ratchet 147 with which coöperates the escapement devices that include a hanger 148 pivotally hung upon the ratchet end of the shaft of the roller 146 and whose upper end terminates in a finger 49 that normally projects in the path of a cam 150 fixedly mounted upon the framing and which is so arranged that as the finger 159 engages it, the hanger 148 is instantly swung up to the position shown in Fig. 35 to cause the pawl 151 to turn the ratchet 147 one space.
At this point, it should be stated, that at each electric impulse transmitted through the paragraphing magnet, the carriage moves the distance of one of the rack teeth (see Figs. 33-34) it being also understood that the escapement pawl shown in Figs. 33-34 holds the rack to its backwardly shifted position as the paragraphing key is actuated.

*Transmission mechanism.*—My present system, in its complete form, embodies the improved construction of transmitting mechanism, shown in detail in Figs. 1 to 13 of the drawings, and at this point it should also be mentioned that an indicator mechanism is coöperatively joined with the paragraphing key of the present transmission means, whereby the set of the carriage and the paragraphing operations at the receiving end may be conveniently effected by the sender, and while I have not illustrated the same, it is obvious a second indicator may be coupled with the indicator devices to notify the sender of the approach of the end of the line at the printing end.
The transmission mechanism disclosed in my present case, in its generic nature, embodies the make and break disk and lever mechanism disclosed in my Patent No. 689,889, and in the present case the said mechanism has been modified and improved on such lines as especially adapt it for use in connection with my special construction of impulse receiving and printing mechanism hereinbefore described.
The transmission mechanism comprises a suitable supporting frame 200, on which the series of key levers 201 are pivotally mounted, each of which operates with a set of circuit controlling devices and as each set of controlling devices and the key lever therefor operates independently of the others, a detailed description of one set of such levers and devices will suffice for all.

Referring now to Figs. 8 to 11, it will be noticed the lever 201 on its rearwardly extending arm carries a circuit controlling disk 202, the controls 202ª of which project laterally therefrom. In my Patent No. 689,889, referred to, the disks are arranged to make a complete revolution to transmit the desired character. In my present case, since the receiving mechanism, before referred to, is constructed to allow for certain differences as to the synchronous arrangement of the coöperating parts of the transmitter and the receiver and to materially increase the speed of the system, the character making teeth 202ª are closely arranged so that the impulses for a character will be sent out and made before the disk completes its revolution and thus for most of the characters make it possible to duplicate them on the disks so that the character is completed, in some instances, on a half or less rotation of the sending disks. The advantage of thus forming the disks will be understood when it is considered that the operator soon learns the character of the type keys and can manipulate them in accordance with the shapes of the disks therefor, those having "long" character makers being operated slower than those having the "short" character makers.

Attention is again directed to the advantage in placing the dot and dash stops on the printing wheels in a plurality of concentric rows instead of a single annular row, as has been heretofore done. Heretofore it has been necessary that the motor speed for the transmitter, and the like speed for the receiver, be in absolute harmony to provide for a proper shifting or setting of the type wheel, and the printing mechanism, and such close or accurate adjustment has, to a certain extent, made it impossible to obtain all the results desired in printing telegraph mechanisms. By reason of stepping off the dot and dash stops and arranging for a positive movement of the type wheel under a dash I am able to obtain an accurate action of the printing mechanism and under a greatly increased speed than heretofore, even when the relative revolutions of the transmitter are 200 to 150. Assuming, now for example, using the "Morse" code, should the lever with character "H" be depressed, the disk for said lever will send four quick impulses to the receiver, and then cease its motion. Again, should the lever "9" be depressed, its disk with two short or "dot" teeth and three elongated or dash teeth, will create two short or dot impulses and three long (dash) impulses.

It should be stated the relative adjustment of the dash fingers and the dash selecting devices on the type wheel has required very careful finishing and accurate timing in the action of the said parts. In my present case, so soon as the dash impulse is started, the selecting device for catching the proper dash lug is in position to engage the selected dash lug before the dash impulse or wiping contact at the sender is broken, and hence the said transmitter wiping contact can be any length greater than the predetermined length necessary to actuate the dash selecting devices.

In the construction shown in the accompanying drawings, the impulse disks do not come into action until the depressed key has been released, the depression of the key merely turning the disk to such position so when the lever is released and the spring 204 pulls the rear end down to the normal position, it brings a mutilated cog gear 205 fixedly connected thereto into engagement with the continuously rotatable gear roll 203 common to all of the disks 202.

Each sending key mechanism includes a pivot drop pawl 207, suspended over the rear edge of the gear portion of the disk in such manner, that when the key is depressed and its rear end is swung up, see Fig. 9, the gear engages the pawl and is thereby with its pulsating disk turned forwardly, see arrow on said Fig. 9, to move the cut out portion 205ª of the gear 202 that is normally over the driving roller forwardly and bring the first tooth 200ª in line to drop into mesh with the said roller, when the key is released and the rear end drops down, see Figs. 9 and 10, it being understood that the selected key disk is now put into rotary action and in case the impulse contacts are so arranged in the disk to require a complete rotation of the disk the single cut or depressed portion 205ª will again come into position over the driving roller, as in Fig. 8, it being understood that if the disk is equipped with two sets of quick acting circuit controls, two diametrically opposite cut out portions 205ª are on the disk, and if three sets of controls are on it there are a like number of tooth cut outs 205ª, and so on.

Each of the key actuated devices includes a wiping plate 206 in circuit with the main line, they being insulated from the main frame which forms the other terminal to the said main line. The transmitting board includes a suplemental or "on" key, the purpose of which (when the transmitter motor is on) is to send in a long or dash impulse for starting the motor for the receiver to put the latter in condition for immediately taking up and printing the first character of the message to be sent, it also including an "off" key for cutting out the system.

The indicator mechanism in my present complete system is coupled with the paragraphing key P², and the said mechanism is best shown in Figs. 2 to 7, by reference to which it will be seen the paragraphing key coacts with an insulated extension p on the throw lever 160 of the indicator, the latter being keyed to a shaft 161, upon which is mounted a shifter device 162 for releasing the feed pawl 163 and the check pawl 164 from the toothed indicator disk 165, that is rotatably mounted on a shaft 166 on the indicator frame, and for such purpose the said device includes the two directing arms 167—168, one of which engages with a lug on the pawl 163 and the other 168 engages a lug on the pawl 164, as best shown in Fig. 4.

Pawl 163 is actuated by the armature 170 of the electro-magnet devices in circuit with all of the character keys and in such manner that the said pawl 163 is actuated to shift the disk to move an indicator finger 171 one degree or space over the indicator dial whenever a character is sent to the receiver, it being understood the said finger connected to the return spring devices 172 is swung back to zero when the paragraph key is depressed.

Having thus described the action of one of the complete wheel type printing mechanisms, I shall now describe how the several sub-circuits in the local or power circuit at the receiving end are successively brought into action for shifting the operation alternately from one type wheel and its coacting devices, and it should be here mentioned that in every instance should the last character sent in have been printed on the "second" wheel the receiving mechanism is automatically controlled so that at the beginning of each message the first printing action is done by wheel No. 1, the same condition existing if the last character printed was printed by the said wheel, the latter always commencing the printing of the message, and the manner in which this operation is provided for and its advantages is explained as follows:

While under a perfect manipulation of my system all the par r carriages of the different machines, located at different points, work in unison and stop on the same carriage space,—it is obvious that by handling the carriages at the different points, they are easily moved out of uniform position, some in advance and some behind the "true" position.

In using my system the paragraphing key is actuated prior to the sending of a new message, which starts back the carriages on all of the machines on the same main line circuit and at the same time brings all of the number 1 printing wheels (the left hand wheel) in position to take up the first character to be sent in.

*The circuit controlling of switch mechanism.*—Referring now more particularly to Figs. 46 to 49, S⁵ designates the switch that throws the local or working circuit, from one side of the receiver to the other side to effect the alternate type wheel actions, before referred to.

S⁵ designates the controlling switch for the main line and it is centrally mounted to rock on a stud S⁶ and with its ends positioned to be moved into engagement with the contacts S⁷, S⁸, in the circuits to the primary magnets, it being understood that when switch S⁵ is moved to the position stated the P. M. at the left is energized to set in action the selecting devices controlled thereby. The movement of switch S⁵ to the position stated and shown in Fig. 46 is effected by a lever 400 that extends transversely of the machine, see Fig. 25, and is fulcrumed at 401, the outer end terminating in a rod 402 that projects through a vertically elongated slot 403 in the front frame plate and in position to act as a pusher for swinging the switch S⁵ down when actuated as follows: At the rear end lever 400 has a pendent lug 433 with which coöperates a slip dog or pawl 404, that extends up through a slotted bracket 405 and whose lower end is hingedly connected to the armature of the release magnet. The upper rear edge of the dog 404 is beveled, and the said dog is so arranged with respect to the lug 433 that as the release magnet is energized the pawl engages the said lug, tilts the lever 400 to cause its rod 402 to push the switch S⁵ to the position shown in Fig. 46 and after having done so to slip its connection with the lug, release the lever 400, which drops back by gravity and raises the pusher rod end back to the top of the slot 403 away from engagement with the switch S⁵ to leave that side of the switch free to move upwardly under the next shifting thereof.

406 designates an adjustable tension device for regulating the dog 404.

It is understood that when the switch S⁵ is set to the position stated, the selecting and printing devices on the other or right hand side have completed the operation. The circuit through the P. M. at the left is now in line and to be closed by the impulse, character or transmitter which first allows the wheel to move to the selected position and after it reaches the selected position, the mechanical devices, before referred to, note,—worm 192 shifts the printing switch 193 to the position shown in dotted lines on Fig. 47 and closes the circuit 301 that energizes the printing and the release magnets, the printing magnet being energized first, as before stated.

During the "release" action, just referred to, the switch S⁵ is thrown over to the other position, see Fig. 47 and such movement is effected by the shifting lever 407, which is constructed and operates the same as lever 400, the release magnet for that side also having the slip pawl devices.

Lever 400 as will be noted in Fig. 17 has a supplemental or finger portion 408 that extends back in the plane of the movement of the paper carriage for coacting with beveled cam 409 on the carriage, the purpose of which is to tilt the lever 400, to rock the controlling switch and lock to close in No. 1 wheel when the carriage travels back to the point of beginning so that every new line is begun by the left hand or No. 1 wheel. Cam 409 is also utilized for breaking the paragraphing magnet circuit and for such purpose as the carriage is fed back to the beginning, said cam 409 engages a rock lever 410, disposed transversely of the machine, whose forward end 411 passes through an elongated slot 412 in the front frame plate to engage and push down the paragraphing circuit controlling switch P shown in Figs. 25 and 46 out of engagement with the said contact when the paragraph key is worked the impulse sent thereby operating the following devices.

Referring now more particularly to Fig. 51, it will be noticed the stop sides of the type wheels each have a pair of supplemental studs of different lengths, one of which, the long one $n$, being termed the motor lever stop, and the other $o$ the paragraph lever stop. Each type wheel mechanism includes a pair of levers N. O. disposed transversely of the machine, and they are hung on the pins $n'$ in stud bearings $n^2$ fixedly attached to the levers 400 that operate the controlling switches, and located at a point between the fulcrum 401 and the lug 433 of the said lever 400, the inner ends of the said levers N. O. have upturned lugs $n^3$—$o^3$ and the outer ends thereof project through the elongated slots $n^4$—$o^4$ in the front frame plate. The levers N and O move freely with the lever 400 and effect no purpose until the type wheels are set to bring the lugs N and O in position for coöperating therewith. Assuming now a paragraph impulse is set in, it starts wheel No. 2 and brings the paragraph stud $o$, into position to be engaged by the lever O the said stud forming a temporary fulcrum bearing for the said lever O, as will be readily understood by now referring to Fig. 26. In this figure, the lever O is shown as having been just started with its rear end lifted to engage the stud $o$, and it is clear that further upthrust of lever 400, through the moving bearings $n'$, now swings the front end of the lever O up and in doing so, causes it to move the paragraphing switch to a closed position, which occurs only at the end of a line or paragraph. Immediately the switch P is closed, as in Fig. 28, the slip dog 404 disengages lever 400 and allows it, with the levers N and O, to drop back out of line with the stops $n$ and $o$ on the type wheel and allows the said type wheel to come back to normal. The same movement of cam 409 engages the lever 410 at the corresponding side and throws the control switch back to position shown in dotted lines in Fig. 48.

Substantially the same operation of parts occurs when the "off key" at transmitter is worked, except in that case the long lug $n$ is brought into the position to coact with the lever N which is moved to shift the motor switch M. S. to the position shown in Fig. 49, which cuts out the motor and stops the machine. The motor switch is thrown into the switching position when the "on" key is worked by rod 430 to the upper end of which is secured an angle portion to form a pull finger 431 that works through the elongated slot 432 in the front frame plate and which rests on the motor switch and is free to move up with the switch M. S. when the latter is swung to the open position, as in Figs. 39 and 49. The lower end of the rod 430 is connected to a crank lever 435 that has a bifurcated heel 436 for straddling on the armature of the two primary magnets, so that as either of the said magnets is energized, when the local or working circuit is made alive from the main line, the crank lever 435 is lifted in the direction of the arrow, see Fig. 40, to pull rod 430 down and thereby shift the M. S. back to the closed position, Figs. 46, 47 and 48.

While the foregoing description illustrates the mechanical working of the various electrically operated devices contained within the receiving and printing machine, I shall point out more clearly the circuits traversed by the different electric impulses as they are received. Assume the three switches M. S., P and S⁵ to be positioned as in Fig. 49. When in such position the machine is inoperative. The operator at the transmitter end upon pressing the "on" key will send an electric impulse over the line, through the relay (Fig. 46) closing terminals c thereby closing the local circuit which now travels from local battery d over wire e to post f, wire g, post h, wire i to primary magnets P. M. (left side Fig. 46) over wire j to terminals S⁷, through switch S⁵ and pivot S⁶ back over wire k, post l, wire m to c and back to battery d thus completing the circuit and energizing magnet P. M. (Fig. 40), drawing down rod 430 and consequently the motor switch which in turn closes the circuit to the motor as follows:—The initial impulse having ceased and motor switch having been closed thereby allowing current to flow from battery d over wire e to post f from thence over wire g', to post h', over wire i' to motor, from thence over wire j' to terminal k', through M. S., over wire l', to post m' wire n' to post o', wire p' to battery d.

That the operations of transmitting the impulses required for shifting the printing wheel to the desired positions be understood and assuming the dash and dot impulses necessary to form the letter "D" in the Morse code, the operations are as follows: The dot finger y is lifted over the first cam when transmitting and forming the said letter D and remains in such position until the releasing magnet 121 comes into action, thus lifting finger y away from engagement with the type wheel to allow the said wheel to rotate to the normal position, which it will do when thus unencumbered or released, it being, of course, noted that the dash finger z is always normally out of engagement and would, in this latter releasing operation, offer no resistance. In transmitting the said letter D: dash impulse; stop finger X raises, dot finger y raises and dash finger z engages the face of the wheel and catches first dash lug (see Fig. 17) and cam 10 being now slightly ahead of the first dash lug will pass under the dot finger y when dash impulse closes, at which time dot finger drops into the outer groove and catches the first dot lug in the back of cam 10 and stops the wheel. First dot impulse lifts the finger y out of engagement with the aforesaid dot lug and drops into the same groove and in position for engaging the next dot lug, the finger z being at this time in the "dead" position on the face of the wheel. The next dot impulse will again drop the finger y in the same groove to engage the next stop. The motor being now in operation, a message may be sent.

In order to bring the paper carriage to the starting point, paragraph key P² is pressed, which sends such a succession of electric impulses over the line as will bring the type wheel 6 which coöperates with the left hand circuit (Fig. 46) and its paragraph lug o in alinement with lever O (similar to Fig. 26) such succession of electric impulses aforesaid closing terminal c by the relay thus closing local circuit through battery d, wire e, post f, wire g, post h, wire i to P. M. (left side Fig. 46) thence over wire j, terminal S⁷, switch S⁵, wire k, post l, wire m, terminal c to battery d. Now type wheel is brought to position shown in Fig. 46. The electric impulse, as before mentioned, having ceased, head 114 of switch arm 103 engages worm 102 which is now in rotation since the motor is in operation (Fig. 23) and the said arm 103 (left side Fig. 46) is carried over toward terminal 108, which when reached closes local circuit from battery d over wire e, post f, wire g² to printing magnet 95 (left side Fig. 46) wire h², wire i², post 104 of switch 103, terminal 108, wire 301, post o', wire p' to battery d and since release magnets 121 (left side Fig. 46) are connected in parallel in the same circuit the current will travel over wire k², magnet 121, wire l², where is connects with wire e. Thus by closing switch point 107 and terminal 108 (left side Fig. 46) the printing and releasing magnets 95 and 121 (left side Fig. 46) will energize and hammer 9 will strike, the type on the wheel being arranged, however, that at this position a blank will occur, and no printing will show.

Since the action of the release magnet armature is slightly retarded, as soon as the printing magnet has performed its function, the armature of magnet 121 (left side of Fig. 46) acts, raising plunger 404, and in turn lever 400 (Fig. 28) and by reason of the engagement of lever O with stop o, paragraph switch P is caused to engage its free terminal which, in turn, now closes the local circuit from battery d, wire e, post f, wire $g^3$ to pivoted terminal of paragraph switch P, through said switch to the other now closed terminal, wire $h^3$, paragraph magnet 125, wire 13, post o', wire p' to battery d. The paragraph magnet 125 now being energized, draws up armature 126 (Fig. 30) causing the engagement of worm gears 128 and 59, thereby rotating shaft 129, serving to carry the paper carriage back through the medium of gear 130 and rack 131 until lug 409 (Fig. 32) on the carriage strikes the end of lever 440 which, swinging in the direction of arrows (Fig. 32) disengages the switch P and breaks the foregoing circuit. Simultaneous with the operation of the release magnet 121 the left hand type wheel 6 was released and returned to normal position, the same action of magnet 121 disengaging switch $S^5$ with terminal $S^6$ and engaging $S^5$ with terminal $S^7$ so that the next electric impulse may operate the right hand wheel 6. The paper carriage is now returned to the beginning of a new line and the motor is still running. It is now desired to send in a message:—The dot and dash impulses coming in over the line operate relay (Fig. 46) closing terminals c, current then travels from battery d over wire c, to post f, over wire g, to post h, wire l to P. M. (right side Fig. 46) switch $S^5$ having been shifted as explained and as in Fig. 47, from P. M. over wire j', terminal $S^6$, through $S^5$, over wire k, to post l, wire m, back to battery d, through terminal c. The character by this succession of electric dot and dash impulses having been selected, worm 102 and switch head 114 (Fig. 23) engage making contact between 107 and 108 (right side of Fig. 46) thus closing the local circuit through printing magnet 95 and release magnet 121 (right side of Fig. 46) similarly to the closing of the local circuit at the left side of Fig. 46 as before described, the printing and releasing being thus accomplished, switch $S^5$ is once more shifted by reason of the depression of finger 402, (Figs. 47 and 23) the magnet 121, shown in Fig. 23 having operated last, switch $S^5$ is now again in engagement with terminal $S^7$ and ready for the next electric character impulse. The sending of the message having ceased and it being desired to stop the printing mechanism,—i. e., by means of the motor, the "off" key is then depressed, which sends such a succession of electric impulses over the line as will bring the lug n (Fig. 41) in line with lever N, the impulses having ceased the worm 102 and member 114 engage (Fig. 23) closing the terminals 107—108 (left side Fig. 46) energizing printing and releasing magnets 95 and 121 (left side Fig. 46) the printing magnet, however, doing no printing, since a blank space is provided in the type of the wheel at this point, magnet 121, however, raising plunger 402 (Fig. 41) and by its coacting parts separating the motor switch M. S. from its terminal, thus breaking the local motor circuit and bringing the machine to rest.

From the foregoing description, taken in connection with the accompanying drawings, the complete construction, the manner in which the several sub-mechanisms individually and collectively operate and the advantages of my present printing telegraph system will be readily apparent to those skilled in the art to which my invention relates.

Among other and important advantages in the construction shown and described, is that any number of operating levers may be embodied since the type wheel dot lugs arrangement used for controlling the switches may be multiplied and used in selecting means for telephone systems, type setting machines, annunciators, and signals for fire and police systems.

The slip pawl devices that coöperate with the release magnets positively prevent locking the levers that throw the means for changing from one side of the machine to the other.

The utilization of the loose play of the carriage for feeding up a new message blank, allows use of paragraph key to make as many lines as desired without operating the forward feed of the paper carriage.

An important advantage in the operation of my present invention is the paper carriage return and automatic break of current at the end of the return, which places all machines that happen to be in the same circuit, together with reference to paper position, as also starting the first letter on the same side of the machine, the left side.

My present adjustment of sending, selecting, printing and release mechanism requires no synchronism, as to action, ample leeway being provided for giving each sub-mechanism time to assume its proper position for a proper coöperation with the connected parts. Furthermore all the levers are operated mechanically not by differential or polarized currents, thus cutting down the number of parts and rendering the operation of the active devices the more reliable than heretofore.

In the complete arrangement of my printing telegraph, the carriage forward step-over step feeding mechanism includes an escapement device, the construction of which is best shown in Figs. 17, 43, 44 and 45 of the drawings, and the same embodies a pawl 415 that is secured to the frame of the machine and which is provided with a laterally projected dog 416 which, when the carriage is to be moved, is lifted out of engagement with the rack bar 417 of the said carriage (see Fig. 44.) and when the character has been selected and printed, the said carriage is held locked from movement, by reason of the dog being moved into engagement with the said rack bar, as indicated in Fig. 43. The up and down movement of the pawl 415 is regulated by the lever 408 which has a finger 418 that extends under a heel 419 on the pawl and which lifts the said pawl to the position shown in Fig. 44 when the lever 408 is swung up in the manner shown by the arrow on Fig. 44, it being obvious that the pawl will drop when the lever 408 drops.

What I claim is:

1. A printing telegraph, comprising in combination, a line circuit, a transmitting means at one end including an intermittently operating pulsator and a receiving means at the other end, the receiving means including a rotary type wheel normally held from rotation and set in action under the impulses sent from the transmitter, selecting devices that control the desired positioning of the wheel, said devices including a plurality of definitely positioned sets of stops on the type wheel, and a single set of selecting members, and means for shifting the said members for coacting with the plurality of the wheel stop sets.

2. A printing telegraph, comprising an electrical circuit, a character ternsmitting device, a type wheel normally inert and set in rotation as the electric impulse is sent in, said wheel having a plurality of concentric rows of selecting stops, selecting fingers for coacting with the said stops and controllable by the impulses from the transmitter, and means for automatically setting the said fingers to engage with certain ones of the successive rows of stops, and means for releasing the type wheel.

3. In a printing telegraph of the character described, the combination with a plurality of type wheels and electric circuit operating means for bringing one after the other of said wheels into active position, a paper carriage that is fed along after the printing action is effected; of means controlled by the final thrust of the carriage for bringing a predetermined one of the type wheels into operative position for action when said carriage is released and returned to its normal position.

4. In a printing telegraph system of the character stated; a continuously rotating shaft, a plurality of like printing wheels frictionally mounted to turn with the shaft, electro-mechanical means for holding the wheels at a normal position and actuated to release the wheels under electric impulses from the transmitting line, a paper carriage and feeding mechanism actuated at the end of movement of the last operated one of the plurality of printing wheels, and a mechanism operable under electric impulses from the transmitting line for printing each character that is successively brought into the printing line.

5. In a printing telegraph system of the character stated, a continuously rotating shaft, a plurality of like constructed and operating printing wheels frictionally held on the shaft and to turn therewith when released, selecting mechanism which includes a stop finger, a main line, transmission devices in the said main line for controlling the selecting mechanism, a printing device, and a releasing device, the said printing and releasing devices including printing and releasing magnets, the said printing and release devices being normally out of action and the printing and release magnets relatively so arranged and timed for action, whereby, when a selected transmission impulse is sent through the main line the printing and release magnets are actuated in succession.

6. In a printing telegraph of the character described, a pair of independently acting rotary printing wheels, a single rotary shaft common to both wheels and frictionally joined therewith, a printing mechanism that coöperates with the two wheels successively, said printing mechanism and the wheels having a relatively fixed relation, a paper carriage for coöperating with the printing wheels and having movement after the completion of each second character, and automatic means for returning the carriage to the normal position.

7. In a printing telegraph system, a pair of type wheels, a pair of type wheel setting mechanisms, one for each type wheel, each of said mechanisms being independently operable, and including a rotary shaft common to both wheels, the said wheels having their printing surface held in a relatively fixed relation with the shaft to thereby turn with the said shaft, electro-mechanical means for alternately setting into action the type wheels to bring them to a selected position, the said means including devices actuated by the electric impulses in the main line of the system.

8. In a telegraph system, the combination of the following elements,—a pair of type wheel setting mechanisms, each held to operate independently of the other; electro-mechanical means for bringing the wheel of one setting mechanism to the printing position as the other wheel and setting devices return to their normal or initial position, and other means for picking up and resetting the first actuated one of the said type wheels and its setting mechanism in position for action at the end of a transmitted line or paragraph.

9. A printing telegraph comprising a pair of type wheels, each held to operate independently of the other; and both having a fixed relation with respect to the printing position; electro-mechanical means for selectively setting the wheels to bring the selected character to the printing position, means for positively stopping and holding the wheel to its set position, actuated by the transmitted impulses, a printing mechanism, including a pair of printing heads, a releasing means for throwing out the wheel selecting devices, and electro-mechanical devices in coöperative connection with the printing and the releasing means adapted for first operating either of the printing heads of the printing mechanism to engage its corresponding type wheel and then operating the releasing means.

10. A printing telegraph comprising a pair of type wheels, each held to operate independently of the other; and both having a fixed relation with respect to the printing position; electro-mechanical means for selectively setting the wheels to bring the selected character to the printing position, means for positively stopping and holding the wheel to its set position, actuated by the transmitted impulses, a printing mechanism including a pair of printing heads, a releasing means for throwing out the wheel position selecting devices, electro-mechanical devices in coöperative connection with the printing and the releasing means adapted for first operating either of the printing heads of the printing mechanism to engage its corresponding wheel and then operating the releasing means, and other means for bringing the first operated wheel and the means for selectively setting the same into position for operation at the end of a printed line or paragraph.

11. In a printing telegraph mechanism of the character described, a continuously rotatable shaft, a type wheel rotatable with the shaft, selecting means for holding the wheel from rotation, a printing mechanism, said mechanism including an electro-magnet, a local source of energy in circuit with the said magnet, a main line transmission, a switch in the said local circuit, means for closing the said switch when the wheel reaches its selected position to thereby energize the printing magnet to set in operation the printing mechanism, and means that holds the said switch open during the movement of the wheel to its selected position, said means being rendered operative during the transmitting of main line impulses.

12. In a printing telegraph mechanism of the character described, a continuously rotatable shaft, a type wheel frictionally mounted thereon to rotate therewith, electro-mechanical selecting mechanism for arresting the wheel at the desired predetermined point, a printing mechanism, said mechanism including a printing head for striking the paper against the selected character on the wheel, an electro-magnet that forms a part of the said printing mechanism for controlling the striking action of the said printing head, a source of local energy for the said magnet, a switch in the circuit to the magnet, means controlled by the main line impulse for closing the said switch to set the printing mechanism into action immediately after the wheel reaches its selected position, and other means set in operation by the transmitted impulses for holding the said switch open as the type wheel moves to its selected position.

13. In a printing telegraph mechanism of the character stated, a rotatable type wheel having stops arranged in concentric rows on one face thereof, said stops being in harmony with the characters on the printing rim of the wheel, means for rotating the wheel to bring the desired character in position for printing, fingers for engaging the said stops to select the position of the wheel, means for moving the said fingers to a release position, devices actuated by the rotation of the wheel for shifting said fingers step by step into position to engage the different rows of stops, and other means for moving the fingers back to the normal position actuated by the wheel as it returns to the normal position.

14. In a printing telegraph system, a printing wheel having the characters on the periphery thereof, stops on the side of the wheel arranged in radial harmony with the wheel characters and in a plurality of concentric rows, electro-mechanical means for imparting rotary motion to the wheel, selecting devices for coacting with the wheel stops, controlled by electric impulses, means on the wheel for shifting the selecting devices in line to engage the predetermined ones of the plurality of rows of stops and for returning the devices to normal at the completion of each character transmitted.

15. In a printing telegraph, in combination, an electrical circuit, a transmitting means, a type wheel normally inert and set in rotation as electric impulses are received, said wheel having the printing characters at the periphery, stop lugs projected laterally from the wheel, said lugs being in radial alinement with the characters and arranged in a plurality of concentric rows, selecting fingers for coacting with the said stops, and controlled by the impulses from the transmitting means, a means on the wheel that intermittently shifts said fingers for engaging the selected stops of the successive rows of stops during the selecting of the character, and other means on the wheel for returning the said fingers to their normal position as the wheel moves to its normal position.

16. In a printing telegraph system of the character stated, a rotary type wheel having printing characters on the periphery thereof, and laterally projected stops, said stops being in radial harmony with the printing characters and arranged in concentric rows, selecting fingers for cooperating with the stops, a fixedly positioned stop finger for holding the wheel at the normal position, and transmitter controlled electro-mechanical means for shifting the several fingers for permitting the wheel to rotate and intermittently shifting the selecting devices to interrupt the rotary movement of the wheel.

17. In a printing telegraph system, a rotary wheel having the printing characters at the periphery and lateral stops arranged in a plurality of concentric rows and in harmony with the printing characters, fingers for selecting and engaging with the stops, transmitter controlled electro-mechanical means for actuating the said fingers for cooperating with the selected ones of the concentric rows of stops to interrupt the rotary motion of the wheels, a plurality of devices on the wheel for successively shifting the said fingers to coact with successive rows of the stops.

18. In a printing telegraph system, a rotary wheel having the printing characters at the periphery and lateral stops arranged in a plurality of concentric rows and in harmony with the printing characters, fingers for selecting and engaging with the stops, transmitter controlled electro-mechanical means for actuating the said fingers for cooperating with the selected ones of the concentric rows of stops to interrupt the rotary motion of the wheel, a plurality of devices on the wheel for successively shifting the said fingers to coact with successive rows of the stops, and a single device on the wheel for shifting the fingers back to the normal position when the wheel moves to its normal position.

19. In a printing telegraph system of the character stated, a rotary type wheel having the printing characters at the peripheral edge and laterally projected stops, the latter being in concentric rows and in radial harmony with the wheel characters, annular concentric flanges on the wheel between the rows of stops, said flanges having stepped cut out portions, and oblique guide flanges at the said cut out portions, selecting fingers for cooperating with the stops, transmitter controlled electro-mechanical means for adjusting the fingers for selecting the predetermined ones of the rows of stops, the said fingers having lateral sliding movement with respect to the wheel, and adapted when the wheel makes it intermittent movements to engage the oblique guides and be shifted laterally in one direction, and other means controlled by the wheel for moving the fingers back to normal after the character is printed and the wheel is released.

20. In a printing telegraph system of the character stated, a rotary printing wheel having the characters at the periphery and provided with stops that project laterally therefrom, the said stops being arranged in radial harmony with the characters on the periphery of the wheel, rockably mounted selecting fingers for cooperating with the said stops, electro-mechanical means controlled from the transmitter for rocking the said fingers into and out of their stopped engaging position, and means for rotating the wheel.

21. In a printing telegraph system of the character stated, a rotary printing wheel having peripherally arranged printing characters and laterally projected stops in radial harmony with the said characters, and a supplemental stop, rockably mounted selecting fingers for cooperating with the character stops and a rockably mounted supplemental finger for coacting with the supplemental stop transmitter controlled electro-mechanical devices for rocking the character stop fingers into and out of the stop engaging position and moving the supplemental finger out of engagement with the supplemental stop whereby to release the wheel and a spring for forcing the supplemental finger normally against the disk or wheel.

22. In a printing telegraph system of the character stated, a rotary printing wheel having peripherally arranged printing characters and laterally projected stops in radial harmony with the said characters, and a supplemental stop, rockably mounted selecting fingers for cooperating with the character stops and a rockably mounted supplemental finger for coacting with the supplemental stop transmitter controlled electro-mechanical devices for rocking the character stop fingers into and out of an engaging position and moving the supplemental finger out of engagement with the supplemental stop whereby to release the wheel and a spring for forcing the supplemental finger normally against the disk of the wheel.

23. In a printing telegraph system, a rotary type wheel having definitely arranged printing characters and dot and dash stops in harmony therewith, said stops being in concentric rows, selecting fingers having movement transversely of the rows of stops, electro-mechanical means for adjusting the said fingers for selecting the stops, means actuated by the intermittent rotation of the type wheel for shifting the fingers in one direction, and other means actuated by the release rotation of the wheel to shift the fingers in the opposite direction.

24. In a printing telegraph system of the character stated, a rotary type wheel having the definitely arranged printing characters and dot and dash stops in harmony with the said characters, said stops being in concentric rows, annular guide flanges between the said rows, slidable selecting fingers, several flanges having passages in stepped relation, oblique guides coöperating with some of the guides for directing the sliding of the selecting fingers inwardly, another guide for directing the movement of the fingers outwardly, electro-mechanical means for imparting rotary motion to the wheels, electro-mechanical means for setting the fingers to select the predetermined ones of the stops and similar means for releasing the wheel after the character is printed.

25. In a printing telegraph system of the character stated, a motor driven shaft, a rotary type wheel frictionally mounted thereon to turn with the shaft when at released position, electro-mechanical means for setting the said wheel to the printing position, a main line, a supplemental circuit, a switch in the said circuit, a release device in the said circuit for freeing the wheel from the set position when the said supplemental circuit is energized, and motor controlled means for locking the switch when the wheel is set to the printing position.

26. In a printing telegraph system, a motor driven shaft, a rotary type wheel frictionally mounted thereon to turn with the shaft when said shaft is in a released condition; electro-mechanical means for setting the said wheel to the printing position, a main line, a supplemental circuit, a switch in the said supplemental circuit, a device in the said supplemental circuit for releasing the wheel from its set position, motor controlled means for closing the said supplemental circuit to hold the wheel releasing circuit closed as the said wheel returns to its initial position, and a means actuated by the final return movement of the wheel for closing the switch in the said supplemental circuit.

27. In a printing telegraph system, a rotary type wheel, means for continuously moving the said wheel in one direction, electro-mechanical means for intermittently arresting the rotation of the said wheel to hold it to a predetermined printing point, a main line, a printing means, other means for releasing the set wheel, each of the said means including an electromagnet whose armature movements control the printing and releasing operations, a supplemental circuit to both magnets and means for bringing the last supplemental circuit into operative connection with the main line at predetermined times, whereby to simultaneously energize the printing and releasing means.

28. In a printing telegraph system, the combination with a rotary type wheel and electro-mechanical means that operate to intermittently arrest the rotation of the said wheel whereby to set the said wheel to the desired positions; of a printing mechanism which includes an actuating lever and a controlling magnet therefor, a releasing mechanism for freeing the type wheel after the printing operation is completed, said releasing mechanism including a lever and a controlling magnet therefor, a single supplemental electric circuit that connects with the magnets of the printing and releasing mechanisms and which is energized when the type wheel reaches the desired printing positions, the said two magnets being relatively so arranged and timed in their movements whereby as the said supplemental electric circuit is energized the printing lever is caused to effect its printing operation before the releasing lever completes its releasing action.

29. In a printing telegraph system, a type wheel in combination with a continuously rotating shaft and electro-mechanical means for intermittently arresting the movement of the wheel and for holding it at a normal or return position, a means for freeing the wheel after it has been held at a predetermined position, a supplemental electric circuit for the magnet operatively connected with the main or transmission line, a switch in the supplemental circuit normally held open by the normal or rest positioning of the type wheel, and means for automatically closing the said switch when the type wheel is set to its selected position.

30. In a printing telegraph system, a continuously rotatable type wheel, electro-mechanical means for intermittently arresting the movement of the said wheel and for holding it at the normal or returned position, means for releasing the wheel arresting means after the printing operation is effected, said releasing means including an electromagnet control, an electric circuit for the said magnet connected with the main line, a switch in the said supplemental circuit, means for automatically closing the said switch set in operation when the wheel reaches its selected position and other means actuated through the main line for moving the said switch to its open position at predetermined times.

31. In a printing telegraph system, the combination of a continuously rotatable type wheel, an electro-mechanical means including a main line for arresting the movement of the said wheel at predetermined times and for holding it at a normal or return position, an electro-magnet, means controlled by the said magnet for freeing the wheel after it has been held at a predetermined position, a supplemental electric circuit for the said magnet connected with the said main line, a switch in the supplemental circuit normally held open by the normal or return position of the type wheel, means for automatically closing the said switch operable when the wheel reaches a selected position, means operated by the main line circuit for moving the switch in the said supplemental circuit as the type wheel moves to its predetermined or selected position, the said means including a tripper pawl that engages said switch and a rod that vibrates the pawl, said rod being actuated by the impulses through the main line that control the movements of the type wheel.

32. In a printing telegraph system; the following elements in combination; a continuously rotatable shaft, a type wheel mounted thereon to rotate thereto, electromechanical means for intermittently arresting the rotation of the said means and to hold it to its selected position, a printing mechanism in which is included an impacting member and an electro-magnet that controls the operation of the said member, an electric circuit to the said electro-magnet, a switch for closing the said circuit at predetermined times to energize the said electro-magnet that controls the impacting member, a means operable from the rotatable shaft for automatically moving the said switch to its circuit closing position and other means controlled by the rotation of the type wheel while being moved to a selected position for holding the said switch to the open position.

33. In a printing mechanism, the following elements in combination; a continuously rotatable shaft, a type wheel mounted to rotate therewith; electro-mechanical means operable under the main line electric impulses to intermittently arrest the rotation of said wheel and to hold it to a selecting position, a printing mechanism that includes an electro-magnet and an impacting member controlled by the magnet, an electric circuit to the said magnet, a switch for closing the said circuit at predetermined times to energize the electro-magnet and operate the impacting member of the printing mechanism, means operable from the rotable shaft for shifting the said switch to its circuit closing position, other means controlled by the rotation of the type wheel while holding the said character position for holding the said switch at the open position, the said other means including a cam device on the type wheel and a pivoted pawl that cooperates with the said cam device and the switch for holding the said switch to the open position.

34. In a printing telegraph system of the character stated, a continuously rotating drive mechanism, said mechanism including a worm shaft, a rotary type wheel, selecting mechanism coöperating therewith for arresting the said wheel at predetermined times, said means including a main line, a paper carriage having a step-by-step movement governed by the type wheel selecting mechanism, a worm and pinion for the carriage for moving it back to the beginning, a paragraphing electro-magnet whose armature moves the worm into mesh with the rotating drive mechanism, a supplemental circuit connected with the main line, a switch in the said supplemental circuit, means actuated by the return of the type wheel to the normal position for closing the said switch.

35. In a printing telegraph system of the character described; the combination with the type wheel, the selecting and printing mechanisms, said mechanisms each including electro-mechanical devices for setting their respective mechanisms in action at predetermined times, a paragraphing magnet, a paper feed carriage that moves forward as the type wheel moves to its returned position; means for moving the said carriage forward, said means including a continuously rotating drive shaft, a worm and pinion mechanism that coöperates with the carriage, an electro-magnet in connection with the main line and the type wheel, and other connections that join the aforesaid magnet and operate to connect the drive shaft and the worm when the paragraphing magnet is energized.

36. In a printing telegraph system of the character described, the combination with the paper carriage and a continuously rotatable shaft, a pinion and rack mechanism for returning the carriage to the point of beginning, said mechanism being normally out of action, an electro-magnet whose armature lever joins with the pinion and rack mechanism and couples the same with the rotary shaft when the magnet is energized, a supplemental electrical circuit, a switch in said circuit, normally open, a main line operatively connected with the supplemental circuit, means operable under an impulse through the main line for closing the said switch whereby to bring the rack and gear devices into action to return the carriage.

37. In a printing telegraph system of the character described, the combination with the paper carriage and a continuously rotatable shaft, a pinion and rack mechanism for returning the carriage to the point of beginning, said mechanism being normally out of action, an electro-magnet whose armature lever joins with the pinion and rack mechanism and couples the same with the rotary shaft when the magnet is energized, a supplemental electrical circuit, a switch in said circuit normally open, means operable by an impulse through the main line for closing the said switch whereby to bring the rack and gear devices into action to return the carriage, and other means actuated by the carriage in its forward movement for opening the said switch.

38. In a printing telegraph of the character stated, in combination with the type wheel, the setting devices therefor, said devices including electro-mechanical means controlled by electric impulses through the main line; of a paper carriage including a rock bar, a supplemental electrical circuit, means under control of the main line for automatically closing the said supplemental circuit when the wheel reaches the selected position, an electro-magnet in the said supplemental circuit, a pivoted pawl that engages the carriage that is actuated by the closing of the armature lever of the magnet for momentarily lifting the pivoted pawl out of the carriage rack.

39. In a printing telegraph of the character stated, in combination with a pair of rotary type wheels, a selecting mechanism for each of the wheels, said mechanisms each including electro-mechanical means including a local circuit controlled by the main line impulses, a switch in the said local circuit, a supplemental electric circuit operatively connected with the local circuit, a releasing magnet in the supplemental circuit, an automatically closing switch in the supplemental circuit that closes the circuit through the releasing magnet at one side after the type wheel at that side reaches its selected position, a lever at each side for closing the local circuit from one set of electro-mechanical means for one wheel to the like set for the other type wheel, said levers being connected with and operable through the movement of the release magnets at their corresponding sides.

40. In a printing telegraph, the combination of a rotary type wheel, electro-mechanical means for intermittently arresting the rotation of the said wheel and selecting its position, a paper carriage, a printing mechanism that coöperates with the wheel, means for automatically moving the carriage forwardly, a pawl for holding the carriage from forward movement, the said means for automatically moving the carriage forwardly including a member for lifting the pawl, a local circuit in line with the printing mechanism, a releasing magnet, a supplemental circuit, means controlled by the set position of the wheel for connecting the said supplemental circuit and the local circuit to thereby energize the releasing magnet, means actuated by the armature of the releasing magnet for disconnecting the selecting devices from the wheel to allow the wheel to return to the normal position and actuate the member for lifting the carriage holding pawl to free the carriage.

41. In a printing telegraph system, a keyboard transmitter including a continuously rotating gear, an impulse sending disk for each key adapted for being moved into mesh with the said gear when the key is depressed, an indicator combined with the transmitter and actuated by the key movements thereof, a main line, a printing mechanism including a rotary type wheel, electro-mechanical means for moving the wheel to the selected positions for printing, local circuits at the printing mechanism end operatively connected to the main line, switches in the said circuits, electro-mechanical means for automatically setting the said switches and bringing into action the printing mechanism and other means for releasing the said type wheels from their set positions at predetermined times, said other means being set in operation by the aforesaid electro-mechanical means.

42. In a printing telegraph, the combination with a paper carriage, means for feeding the same step-by-step, said means including a tension device for pulling the carriage forward, a magnet released check pawl, of a rack and gear mechanism for returning the carriage, normally running loose, and means including an electro-magnet for bringing the said rack and gear mechanism into action while the said electro-magnet is energized, said rack and gear mechanism including frictionally joined parts for the purpose specified.

43. In a printing telegraph, a paper carriage and feed mechanism, comprising the following elements in combination, a reciprocably mounted carriage, means for shifting the carriage forwardly step-by-step, said carriage having a limited free motion at the end of its return position, means for returning the carriage including a magnet controlled drive mechanism, a stop at the end of the carriage frame with which the carriage abuts when moved to the limit of its return thrust, a roller paper feed on the carriage mechanism including ratchet and pawl devices actuated under the impact force of the carriage at the limit of its return strike for rotating the feed rolls to move up the paper to the desired line spaces.

44. In a printing telegraph system, a paper carriage and feed mechanism therefor, the said mechanism comprising the following elements in combination; a reciprocally mounted carriage, electro-mechanical means controlled from the transmission end of the system for advancing the carriage step-by-step to produce character spaces, other means including a paragraphing key at the transmission end of the system and a magnet controlled drive mechanism operable under the electric impulses transmitted by the paragraphing key for moving the carriage backward, means on the carriage for feeding the paper lengthwise to produce the line or blanking spaces, the said means including paper engaging rolls and pawl and ratchet devices coöperating therewith for moving the said rolls to impart the line space movements to the paper, and a fixedly held cam device that coöperates with the said pawl and ratchet devices when the carriage is moved backwardly after having completed its line of character spaces to actuate the said pawl and ratchet devices to rotate the paper rolls.

45. In a printing telegraph, a line circuit including a source of electric energy, a transmitter in said line circuit and including a plurality of keys for making and breaking the electrical circuit, certain of said keys being character transmitting keys, another of said keys being an "on" key, another of said keys being an "off" key; a receiving instrument in said circuit that includes an operating motor, means controlled by said "on" and "off" keys of said transmitter for starting and stopping said motor, said receiving instrument also including a printing mechanism, and means controlled by said character transmitting keys of said transmitter for selecting, setting and operating said printing mechanism.

46. In a printing telegraph, a line circuit including a source of electric energy, a transmitter, coöperative connections that join the transmitter and the line circuit, the said transmitter, including a plurality of keys for making and breaking the electrical circuit, certain of said keys being character transmitting keys, another of said keys being an "on" key, another of said keys being an "off" key, and another of said keys being a paragraph key; a receiving instrument coöperatively connected with the said circuit that includes an operating motor, means controlled by said "on" and "off" keys of said transmitter for starting and stopping said motor, said receiving instrument also including a printing mechanism, means controlled by said character transmitting keys of said transmitter for selecting, setting and operating said printing mechanism, said receiving instrument including a paper carriage, a carriage feeding mechanism for letter spacing, and means controlled by said paragraphing key for restoring said paper carriage to its initial position and moving the paper to line space.

47. In a printing telegraph, a line circuit including a source of electric energy, a transmitter in said line circuit and including a plurality of keys for making and breaking the electrical circuit, certain of said keys being character transmitting keys, another of said keys being an "on" key, another of said keys being an "off" key; a receiving instrument coöperatively connected with the said circuit that includes an operating motor, means controlled by said "on" and "off" keys of said transmitter for starting and stopping said motor, said receiving instrument also including a printing mechanism, a paper carriage and mechanism for letter spacing said carriage, means controlled by said character transmitting keys of said transmitter for selecting, setting and operating said printing mechanism; a local circuit including a source of energy, and a set of circuit contacts controllable by said transmitter keys, and an indicator in said local circuit for indicating the letter spacing of said receiving instrument carriage.

48. In a printing telegraph, a line circuit including a source of electric energy, a transmitter in said line circuit and including a plurality of keys for making and breaking the electrical circuit, certain of said keys being character transmitting keys, another of said keys being an "on" key, another of said keys being an "off" key, and another of said keys being a paragraph key; a receiving instrument coöperatively connected with the said circuit that includes an operating motor, means controlled by said "on" and "off" keys of said transmitter for starting and stopping said motor, said receiving instrument also including a printing mechanism, means controlled by said character transmitting keys of said transmitter for selecting, setting and operating said printing mechanism, said receiving instrument including a paper carriage, a carriage feeding mechanism for letter spacing, means controlled by said paragraphing key for restoring said paper carriage to its initial position and moving the paper to line space; a local circuit including a source of energy, and a set of circuit contacts controllable by said transmitter keys, and an indicator in said local circuit for indicating the letter spacing of said receiving instrument carriage.

49. In a printing telegraph, a receiving instrument including a plurality of printing wheels rotatable in fixed planes, a paper carriage, a step-by-step feeding mechanism for imparting motion to said carriage after the printing operation by both of said wheels to letter space every two letters.

50. In a printing telegraph, a pair of type wheels each rotatable in a fixed plane, an independently operative setting mechanism for each type wheel, said setting mechanisms including common rotatable shaft on which said wheels are frictionally mounted to turn with the shaft, means for normally holding said wheels from turning with said shaft, electro-mechanical devices coöperative with the aforesaid holding means for alternately releasing said wheels during predetermined intervals to permit them to turn with the shaft and move into a selected position for printing, said devices including selecting mechanism therefor controlled by electrical line impulses for setting said devices into operation.

51. In a machine of the character stated, a rocking switch arm, two sets of arm rocking devices each including a finger for engaging the switch arm and electro-magnetically actuated devices operating during the first part of their movement to operate said fingers and rock said arm and upon further movement to disengage from said fingers.

52. In a machine of the character stated, a rocking switch arm, a finger engaging said arm to rock it in one direction, and electro-magnetically actuated means operating when energized to first engage said finger to rock said switch arm and subsequently disconnect themselves from said finger.

53. In a device of the character stated, a rocking switch arm, two fingers for rocking said arm, one operating to rock said arm in one direction, and the other operating to rock said arm in the opposite direction, two sets of electro-magnetic devices one for each finger and including means for first engaging the respective finger to rock said arm and for disengaging said finger to release the same free.

54. In a printing telegraph system of the character stated, a rotary type wheel, a plurality of concentric rows of systematically arranged stops coöperative with the type characters, selecting fingers for engaging said stops and including a fixedly positioned stop finger for stopping and holding the wheel at the normal position, transmitter controlled electro-mechanical mechanism for shifting the several fingers to permit predetermined interrupted rotation of the wheel.

55. In a printing telegraph system of the character stated, a rotary printing wheel having printing characters at the periphery and provided with stops on its side face arranged in coöperative relation to the printing characters, rockable selecting fingers coöperating with the stops, transmitter controlled electro-mechanical means for rocking the said fingers into and out of the stop engaging position, and means for rotating the wheel, and a yielding abutment for limiting the back throw of the said fingers.

56. In a printing telegraph, a rotary type wheel, a plurality of switch throwing levers, laterally projecting lugs on said type wheel for controlling the operation of said levers and means for moving said levers to effect their operation.

57. In a printing telegraph receiving instrument, a plurality of switch throwing levers, operative connections between said levers and a controlling fulcrum for one of said levers, and means for moving said fulcrum into position under control of the make and break impulses of the main line circuit.

58. In a printing telegraph, the rotary type wheel and the means for setting it into position combined with a circuit controlling switch, and operating devices therefor, said operating devices including a main lever, a second lever supported by said main lever to throw the switch and means controlled by the position of the type wheel for rendering the switch throwing lever operative and other means for moving the levers to operate the same when the switch throwing lever is rendered operative and thereby operate the switch.

59. In a printing telegraph mechanism, a printing wheel, a paper carriage, a paper carriage forward feeding mechanism, a paper carriage returning mechanism, and means for line-spacing the paper on the return movement of the carriage, said paper carriage returning mechanism including an electric circuit controlled by main line impulses and operating magnets in said electric circuit together with a circuit switch in said electric circuit, and means operating at the end of the return thrust of the carriage for moving said switch to break the circuit.

OSCAR L. KLEBER.

Witnesses:
W. C. DICKEN,
HENRY KLEBER, Jr.